United States Patent
Son et al.

(10) Patent No.: US 11,508,146 B2
(45) Date of Patent: Nov. 22, 2022

(54) CONVOLUTIONAL NEURAL NETWORK PROCESSING METHOD AND APPARATUS

(71) Applicant: Samsung Electronics Co., Ltd., Suwon-si (KR)

(72) Inventors: Jinwoo Son, Seoul (KR); Changyong Son, Anyang-si (KR); Chang Kyu Choi, Seongnam-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 124 days.

(21) Appl. No.: 16/991,454

(22) Filed: Aug. 12, 2020

(65) Prior Publication Data

US 2020/0372276 A1 Nov. 26, 2020

Related U.S. Application Data

(63) Continuation of application No. 15/798,461, filed on Oct. 31, 2017, now Pat. No. 10,755,126.

(30) Foreign Application Priority Data

Nov. 7, 2016 (KR) .................. 10-2016-0147562

(51) Int. Cl.
*G06V 10/94* (2022.01)
*G06N 3/04* (2006.01)
(Continued)

(52) U.S. Cl.
CPC .......... *G06V 10/95* (2022.01); *G06K 9/6256* (2013.01); *G06N 3/04* (2013.01); *G06N 3/0454* (2013.01); *G06N 3/063* (2013.01); *G06N 3/08* (2013.01)

(58) Field of Classification Search
CPC ...... G06K 9/6256; G06N 3/04; G06N 3/0454; G06N 3/063; G06N 3/08; G06V 10/95
See application file for complete search history.

(56) References Cited

U.S. PATENT DOCUMENTS 5,048,100 A 9/1991 Kuperstein
5,647,027 A 7/1997 Burges et al.
(Continued)

FOREIGN PATENT DOCUMENTS

CN 1862524 A 11/2006
CN 102592258 A 7/2012
(Continued)

OTHER PUBLICATIONS

Hyunsun Park,"Zero and Data Reuse-aware Fast Convolution for Deep Neural Networks on GPU,"Oct. 1, 2016,CODES '16: Proceedings of the Eleventh IEEE/ACM/IFIP International Conference on Hardware/Software Codesign and System SynthesisOct. 2016 Article No. 33,https://doi.org/10.1145/2968456.2968476,pp. 1-10.*

(Continued)

*Primary Examiner* — Omar S Ismail
(74) *Attorney, Agent, or Firm* — NSIP Law

(57) ABSTRACT

A convolutional neural network (CNN) processing method and apparatus. The apparatus may select, based on at least one of a characteristic of at least one kernel of a convolution layer or a characteristic of an input of the convolution layer, one operation mode from a first operation mode reusing a kernel, of the at least one kernel, and a second operation mode reusing the input, and perform a convolution operation based on the selected operation mode.

14 Claims, 13 Drawing Sheets

(51) Int. Cl.
*G06N 3/063* (2006.01)
*G06K 9/62* (2022.01)
*G06N 3/08* (2006.01)

(56) References Cited

U.S. PATENT DOCUMENTS

| | | |
|---|---|---|
| 6,760,486 B1 | 7/2004 | Chiao et al. |
| 7,016,529 B2 | 3/2006 | Simard et al. |
| 7,337,205 B2 | 2/2008 | Sazegari |
| 7,634,137 B2 | 12/2009 | Simard et al. |
| 2009/0220156 A1 | 9/2009 | Ito et al. |
| 2014/0288928 A1 | 9/2014 | Penn et al. |
| 2014/0355861 A1 | 12/2014 | Nirenberg et al. |
| 2016/0217369 A1* | 7/2016 | Annapureddy ........ G06N 3/082 |
| 2016/0321784 A1* | 11/2016 | Annapureddy ...... G06N 3/0454 |
| 2016/0335120 A1 | 11/2016 | Gupta et al. |
| 2016/0342888 A1 | 11/2016 | Yang et al. |
| 2016/0358068 A1 | 12/2016 | Brothers et al. |
| 2016/0358069 A1 | 12/2016 | Brothers et al. |
| 2016/0358070 A1 | 12/2016 | Brothers et al. |
| 2017/0287109 A1* | 10/2017 | Tasfi .................... G06K 9/6215 |
| 2018/0096226 A1* | 4/2018 | Aliabadi .................. G06N 3/10 |
| 2018/0259608 A1* | 9/2018 | Golden .................... G06N 3/02 |
| 2019/0012768 A1 | 1/2019 | Tafazoli Bilandi et al. |
| 2019/0138902 A1* | 5/2019 | Matveev ................ G06V 10/82 |
| 2019/0261945 A1* | 8/2019 | Funka-Lea ............... A61B 8/12 |

FOREIGN PATENT DOCUMENTS

| | | |
|---|---|---|
| JP | 5376920 B2 | 12/2013 |
| JP | 5777367 B2 | 9/2015 |
| KR | 10-2016-0038741 A | 4/2016 |
| KR | 10-2016-0069834 A | 6/2016 |

OTHER PUBLICATIONS

Shouyi Yin,"An ultra-high energy-efficient reconfigurable processor for deep neural networks with binary/ternary weights in 28nm CMOS," Oct. 25, 2018,2018 IEEE Symposium on VLSI Circuits,pp. 37-38.*

Sharan Chetlur,"cuDNN: Efficient Primitives for Deep Learning," Dec. 18, 2014,Neural and Evolutionary Computing,arXiv: 1410.0759, pp. 1-8.*

Yizhi Wang,"FPAP: A Folded Architecture for Energy-Quality Scalable Convolutional Neural Networks," Jul. 27, 2018, IEEE Transactions on Circuits and Systems-I: Regular Papers, vol. 66, No. 1, Jan. 2019,pp. 2887.*

Hyeonuk Kim,"A Kernel Decomposition Architecture for Binary-weight Convolutional Neural Networks," Jun. 18, 2017, DAC '17: Proceedings of the 54th Annual Design Automation Conference 2017, Jun. 2017,Article No. 60, pp. 1-5.*

Fengbin Tu,"Deep Convolutional Neural Network Architecture With Reconfigurable Computation Patterns," Apr. 12, 2017,IEEE Transactions on Very Large Scale Integration (VLSI) Systems, vol. 25, No. 8, Aug. 2017,pp. 2220-2228.*

Chetlur, Sharan et al., "cuDNN: Efficient Primitives for Deep Learning," arXivpreprint arXiv:1410.0759, 2014 (pp. 1-9).

Park, Hyunsun et al., "Zero and Data Reuse-aware Fast Convolution for Deep Neural Networks on GPU," 2016 International Conference on Hardware/Software Codesign and System Synthesis (CODES+ISSS), 2016 (pp. 1-10).

Chen, Yu-Hsin et al., Eyeriss: A Spatial Architecture for Energy-Efficient Dataflow for Convolutional Neural Networks, 2016 ACM/IEEE 43rd Annual International Symposium on Computer Architecture, Issue: 99, 2016 (pp. 367-379).

Chen, Yu-Hsin et al., "Eyeriss: An Energy-Efficient Reconfigurable Accelerator for Deep Convolutional Neural Networks," IEEE Journal of Solid-State Circuits, vol. 52, No. 1, Jan. 2017 (pp. 127-138).

Extended European Search Report dated Apr. 11, 2018 in corresponding European Application No. 17197450.4 (12 pages in English).

Chinese Office Action dated Sep. 15, 2022, in counterpart Chinese Patent Application No. 201710970971.2 (11 pages in English and 8 pages in Chinese).

\* cited by examiner

CONVOLUTIONAL NEURAL NETWORK PROCESSING METHOD AND APPARATUS

CROSS-REFERENCE TO RELATED APPLICATION(S)

This application is a continuation of U.S. patent application Ser. No. 15/798,461 filed on Oct. 31, 2017, which claims the benefit under 35 USC § 119(a) of Korean Patent Application No. 10-2016-0147562 filed on Nov. 7, 2016, in the Korean Intellectual Property Office, the entire disclosures of which are incorporated herein by reference for all purposes.

BACKGROUND

1. Field

The following description relates to convolutional neural network (CNN) processing technology, and in particular to a CNN processing method and apparatus.

2. Description of Related Art

Neural network-based deep learning technology has been used in different fields of art and implementations. For example, deep learning-based biometric recognition and verification may be implemented to recognize, for example, a face, an iris, and a voice, by a terminal, for example, a smartphone or desktop computer, for example. A convolutional neural network (CNN) refers to a trained multilayer neural network structure in which one or more convolution operations are implemented. For example, deep learning-based image and voice recognition may be implemented through a trained CNN. However, as such trained CNNs become more sophisticated and proficient, they require more and more resources of the underlying terminal, to an extent that some trained CNNs may not be operable or implementable, or not operable or implementable in real time, on lesser capable terminals, such as the example smartphone.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, a processor implemented method of processing a convolutional neural network (CNN) includes selecting, based on at least one of a characteristic of at least one kernel of a convolution layer or characteristic of an input of the convolution layer, one operation mode from a first operation mode reusing a kernel, of the at least one kernel, and a second operation mode reusing the input, and performing a convolution operation based on the selected operation mode.

The CNN may include a plurality of convolution layers, and the method may further include adaptively performing the selecting of the one operation mode for each of the convolution layers based on characteristics of kernels of the convolution layers and/or characteristics of inputs of the convolution layers.

The characteristic of the at least one kernel may include at least one of a ratio of zero value kernel elements included in the at least one kernel and non-zero value kernel elements included in the at least one kernel, and a size of the at least one kernel, and the characteristic of the input may include at least one of a ratio of zero value input elements included in the input and non-zero value input elements included in the input, and a size of the input.

The selecting of the one operation mode may include obtaining a ratio of zero value input elements included in the input to non-zero value input elements included in the input, and selecting the one operation mode corresponding to a greater value between the obtained ratio and a ratio of zero value kernel elements included in the at least one kernel and non-zero value kernel elements included in the at least one kernel.

The selecting of the one operation mode may include selecting the one operation mode based on a ratio between a size of the input and a size of the at least one kernel.

The characteristic of the at least one kernel and the characteristic of the input may be determined based on a depth of the convolution layer in the CNN, and the selecting of the one operation mode may include selecting the one operation mode satisfying a constraint associated with at least one of a data loading number or a capacity of an operating memory, based on the at least one of the characteristic of the at least one kernel or the characteristic of the input.

The selecting of the one operation mode may include selecting the one operation mode corresponding to a smaller value between a first data loading number for the first operation mode and a second data loading number for the second operation mode.

The selecting of the one operation mode may include obtaining the first data loading number, where the first data loading number may be based on a sum of a kernel loading number calculated based on a size of the at least one kernel and an input loading number calculated based on a number of zero value kernel elements included in the at least one kernel and a size of the input.

The selecting of the one operation mode may include obtaining a number zero value input elements included in the input, and calculating the second data loading number based on a sum of an input loading number calculated based on a size of the input and a kernel loading number calculated based on the number of zero value input elements and a size of the at least one kernel.

The performing of the convolution operation may include, in response to the first operation mode being selected, performing the convolution operation based on first information specifying which input elements correspond to which kernel elements included in the kernel among input elements included in the input and second information specifying, among output elements included in an output of the convolution operation, output elements to which results of operations between the kernel elements and the specified input elements in the convolution operation are mapped.

The performing of the convolution operation may include loading one kernel element among the kernel elements, loading input elements indicated as corresponding to the loaded kernel element based on the first information, and updating output elements to which results of operations between the loaded kernel element and the loaded input elements are indicated as being mapped based on the second information.

The first information may be determined based on locations of the kernel elements, a size and a convolutional stride of the kernel, and a size and a pad of the input, and the second information may be determined based on the locations of the kernel elements and locations of the specified input elements.

The performing of the convolution operation may include, in response to the first operation mode being selected, loading one kernel element among kernel elements included in the kernel, and, in response to the loaded kernel element having a zero value, skipping loading of input elements corresponding to the loaded kernel element or skipping operations associated with the loaded kernel element.

The performing of the convolution operation may include, in response to the first operation mode being selected, allocating at least one temporary buffer corresponding to kernel elements included in the kernel, loading one kernel element among the kernel elements in the kernel, and performing the convolution operation based on the loaded kernel element and a temporary buffer corresponding to the loaded kernel element.

The performing of the convolution operation may further include loading another kernel element different from the loaded kernel element among the kernel elements, and, in response to the other kernel element not having a zero value, performing the convolution operation based on results of operations between the other kernel element and input elements stored in a temporary buffer corresponding to the other kernel element.

The performing of the convolution operation may include, in response to the first operation mode being selected, loading one kernel element among kernel elements included in the kernel, in response to the loaded kernel element having a zero value, skipping allocation of a temporary buffer, and, in response to the loaded kernel element not being zero, allocating the temporary buffer based on a location of the loaded kernel element, a size and a convolutional stride of the kernel, and a size and a pad of the input, loading input elements corresponding to the loaded kernel element and storing, in the allocated temporary buffer, the loaded input elements, and performing the convolution operation based on results of operations between the loaded kernel element and the input elements stored in the temporary buffer.

The performing of the convolution operation may include, in response to the second operation mode being selected, performing the convolution operation based on first information specifying which kernel elements correspond to which input elements included in the input among kernel elements included in the kernel and second information specifying, among output elements included in an output of the convolution operation, output elements to which results of operations between the input elements and the specified kernel elements in the convolution operation are mapped.

The performing of the convolution operation may include loading one input element among the input elements, loading kernel elements indicated as corresponding to the loaded input element based on the first information, and updating output elements to which results of operations between the loaded input element and the loaded kernel elements are indicated as being mapped, based on the second information.

The first information may be determined based on locations of the input elements, a size and a convolutional stride of the at least one kernel, and a size and a pad of the input, and the second information may be determined based on the locations of the input elements and locations of the specified kernel elements.

The performing of the convolution operation may include, in response to the second operation mode being selected, loading one input element among input elements included in the input, and, in response to the loaded input element having a zero value, skipping loading of kernel elements corresponding to the loaded input element or skipping operations associated with the loaded input element.

The reusing of the kernel of the first operation mode may include loading the kernel or kernel element(s) once to one or more temporary buffers from a main memory and repetitively applying the loaded kernel or kernel element(s) in the temporary buffer to the input or portions of the input that are loaded more than once from a memory for a convolution operation between the kernel and the input.

The reusing of the input of the second operation mode may include loading or storing the input or input element(s) once in one or more temporary buffers and repetitively applying the loaded or stored input or input element(s) in the one or more temporary buffers to the kernel or portions of the kernel that are loaded more than once from the main memory for a convolution operation between the kernel and the input.

The reusing of the kernel of the first operation mode may include independently applying respective portions of kernel elements of the kernel to separate repeated collections of input elements of the input.

The independently applying of the respective portions of the kernel elements of the kernel may include loading the respective portions of the kernel elements from a main memory to one or more temporary buffers and multiplying the loaded respective portions of the kernel elements by separately loaded, from a memory, same collections of the input elements of the input.

The independently applying of the respective portions of the kernel elements may further include implementing a zero skipping operation to skip the independently applying of the respective portions of the kernel elements for kernel elements that are determined to have a zero value.

The reusing of the input of the second operation mode may include independently applying respective portions of the input to separate repeated collections of kernel elements of the kernel.

The independently applying of the respective portions of the input may include loading the respective portions of the input from a memory to one or more temporary buffers and multiplying the loaded respective portions of the input by separately loaded same collections of the kernel elements of the kernel.

The independently applying of the respective portions of the input further may include implementing a zero skipping operation to skip the independently applying of the respective portions of the input for input elements that are determined to have a zero value.

The selecting of the one operation mode may be performed independently for each of plural convolutional layers of the CNN and the performance of the convolution operations may include performing each respective convolution operation for each of the plural convolutional layers, and the method may further include performing an interpretation of a captured image by inputting the captured image to the CNN and indicating a result of the interpretation based on the performed respective convolution operations.

In one general aspect, there is provided a non-transitory computer-readable storage medium storing instructions, which when executed by computing hardware, cause the computing hardware to implement one, any combination of two or more, or all operations described herein.

In one general aspect, an apparatus for processing a convolutional neural network (CNN) includes a processor configured to select, based on at least one of a characteristic of at least one kernel of a convolution layer or a characteristic of an input of the convolution layer, one operation mode from a first operation mode reusing a kernel, of the at least one kernel, and a second operation mode reusing the input, and perform a convolution operation based on the selected operation mode.

The CNN may include a plurality of convolution layers, and the processor may be configured to adaptively perform the selecting of the one operation mode for each of the convolution layers based on characteristics of kernels of the convolution layers and/or characteristics of inputs of the convolution layers.

The characteristic of the at least one kernel may include at least one of a ratio of zero value kernel elements included in the at least one kernel and non-zero value kernel elements included in the at least one kernel, or a size of the at least one kernel, the characteristic of the input may include at least one of a ratio of zero value input elements included in the input and non-zero value input elements included in the input, or a size of the input, the characteristic of the at least one kernel and the characteristic of the input may be determined based on a depth of the convolution layer in the CNN, and the processor may be configured to select the one operation mode satisfying a constraint associated with at least one of a data loading number or a capacity of an operating memory, based on the at least one of the characteristic of the at least one kernel or the characteristic of the input.

The apparatus may further include a memory configured to record a first data loading number for the first operation mode, wherein the first data loading number may be based on a sum of a kernel loading number calculated based on the size of the at least one kernel and an input loading number calculated based on a number of zero value kernel elements included in the at least one kernel and the size of the input, and the processor may be configured to obtain the first data loading number, obtain a number of zero value input elements included in the input, calculate a second data loading number based on a sum of an input loading number calculated based on the size of the input and a kernel loading number calculated based on the number of zero value input elements and the size of the at least one kernel, and select the one operation mode corresponding to a smaller value between the first data loading number for the first operation mode and the second data loading number for the second operation mode.

The processor may be configured to, in response to the first operation mode being selected, perform the convolution operation based on first information specifying which input elements correspond to which kernel elements included in the kernel among input elements included in the input and second information specifying, among output elements included in an output of the convolution operation, output elements to which results of operations between the kernel elements and the specified input elements in the convolution operation are mapped.

The processor may be configured to, in response to the first operation mode being selected, load one kernel element among kernel elements included in the kernel and, in response to the loaded kernel element having a zero value, skip loading of input elements corresponding to the loaded kernel element or skip operations associated with the loaded kernel element.

The processor may be configured to, in response to the second operation mode being selected, perform the convolution operation based on first information specifying which kernel elements correspond to which input elements included in the input among kernel elements included in the kernel and second information specifying, among output elements included in an output of the convolution operation, output elements to which results of operations between the input elements and the specified kernel elements in the convolution operation are mapped.

The processor may be configured to, in response to the second operation mode being selected, load one input element among input elements included in the input and, in response to the loaded input element having a zero value, skip loading of kernel elements corresponding to the loaded input element or skip operations associated with the loaded input element.

For the selecting of the one operation mode and performance of the convolution, the processor may be further configured to perform the selecting of the one operation mode independently for each of plural convolutional layers of the CNN and perform each respective convolution operation for each of the plural convolutional layers, and the processor may still further be configured to perform an interpretation of a captured image by inputting the captured image to the CNN and control an indicating of a result of the interpretation based on the performed respective convolution operations.

The apparatus may further include an image sensor to generate the captured image, and the processor may be configured to control an acquiring of the captured image and inputting of the captured image to the CNN.

In a general aspect, a processor implemented method of processing a convolutional neural network (CNN) includes selecting an operation mode between a first operation mode and a second operation mode to perform convolution of an input with respect to one or more kernels, and performing the convolution using the selected operation mode, wherein the first operation mode includes independently applying respective portions of kernel elements of a kernel, of the one or more kernels, to separate repeated collections of input elements of the input, and wherein the second operation mode includes independently applying respective portions of the input to separate repeated collections of the kernel elements of the kernel.

The respective portions of the kernel elements of the kernel may be respective singular connection weight values or zero-order tensors of the kernels.

The respective portions of the kernel elements of the kernel may be respective different channel connection weight values of the kernel or a first-order tensor of the kernel representing connection weights of different channels of the kernel.

The respective portions of the input may be respective singular input values or zero-order tensors of the input.

The respective portions of the input may be respective different channel input values of the input or a first-order tensor of the input representing input values of different channels of the input.

Other features and aspects will be apparent from the following detailed description, the drawings, and the claims.

Figure 1:
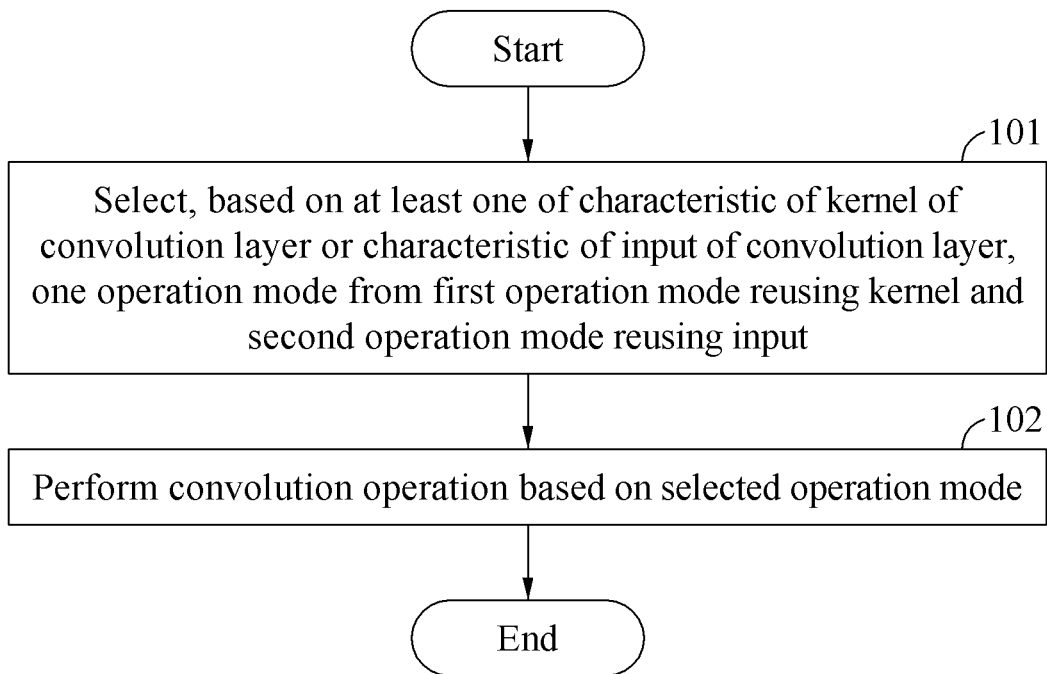
FIG. 1 is a flowchart illustrating an example of a method of implementing a convolutional neural network (CNN).

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. The sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. For example, as used herein, singular forms are intended to include plural forms as well, unless the context clearly indicates otherwise. As used herein, the singular forms "a," "an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "coupled," or "joined" to another component, a third component may be "coupled," and "joined" between the first and second components, although the first component may be directly coupled or joined to the second component. In addition, it should be noted that if it is described in the specification that one component is "directly coupled" or "directly joined" to another component, a third component may not be present therebetween. Likewise, expressions, for example, "between" and "immediately between" and "adjacent to" and "immediately adjacent to" may also be construed as described in the foregoing. The use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

FIG. 1 is a flowchart illustrating an example of a method of implementing a convolutional neural network (CNN). Hereinafter, the method of implementing a CNN according to one or more embodiments is simply referred to as a CNN processing method.

Referring to FIG. 1, in operation 101, an apparatus implementing a CNN, hereinafter simply referred to as a CNN processing apparatus, selects, based on at least one of a characteristic of a kernel of a convolution layer or a characteristic of an input of the convolution layer, one operation mode from a first operation mode reusing the kernel and a second operation mode reusing the input. In an example, the CNN processing apparatus may be a recognition, rejection, or verification apparatus, such as described below with respect to FIG. 10. In addition, as explained below, in machine learning herein, a CNN, which is a type of a neural network, may include one or a plurality of convolution layers designed to perform respective convolution operations. In addition, the CNN may have additional layers, such as fully connected layers, as well as input and output layers. The convolution layer in the CNN may perform a convolution operation associated with an input to the convolution layer using one or more kernels.

For example, in the present disclosure, apparatuses may be described as implementing CNNs, e.g., based on convolutions using previously trained parameters and/or convolutions or convolution operations that are selectively performed based on such previously trained parameters, though embodiments are not limited to such apparatuses only performing such convolutional and/or selective convolutional operations, but rather embodiments also include such apparatuses also being configured to train the CNN as described below, as well as or also use the trained CNN and/or selectively implemented CNN in an example recognition, rejection, verification, classification, or other such 'interpretative' operations or objectives the respective layers or overall CNN are trained to perform.

Referring to FIG. 1, the CNN processing apparatus may acquire trained parameters corresponding to one or more layers included in a neural network, e.g., the herein discussed example CNN type of neural network, noting that embodiments are not limited thereto. For example, the CNN processing apparatus may acquire parameters, e.g., as determined by the CNN processing apparatus during the training of the neural network by the CNN processing apparatus, from memory, or through external request or provision. Additionally, the CNN processing apparatus may acquire the parameters from provided kernel, kernel element, and/or other connection weight vectors, matrix or matrices, or other format kernels, kernel elements, and/or other connection weights, representing some or all of the trained kernels and/or weighted connections of the trained neural network. The CNN processing apparatus may also be provided or made available the kernel, kernel element, and/or other connection weight vectors, matrix or matrices, or other format kernels, kernel elements, and/or connection weights, as a result of training of the neural network by another processing apparatus or server, for example. The CNN processing apparatus is representative of one or more processors and one or more non-transitory memories, for example, such as to store such parameters, for use during and after the convolutional and/or selective convolutional operations of the neural network, and for storing of instructions, which when executed by the one or more processors, cause the one or more processors to implement one or more or all operations described herein, for example.

The neural network includes a plurality of layers, and each of the layers includes a plurality of nodes. For example, there may be an input layer, at least one hidden layer, and an output layer. Depending on the architecture of the neural network, nodes included in neighboring layers may be selectively connected according to respective connections, e.g., which may or may not be weighted. For example, the neural network may be implemented by a processor, i.e., one or more processors, configured to generate a neural network structure/architecture with such a plurality of layers each including plural nodes and configured to apply such example weighted connections between neighboring nodes in neighboring layers of the neural network structure, and/or apply such example kernels or weighted connections within layers, to interpret input data applied to the neural network structure. As only examples, herein such an 'interpretation' of input data may include a performed recognition, verification, or rejection, such as language/acoustic or image recognition or verification, translation or rejection, or input data binary or multi-class classification, clustering, pattern observation, transformation, and/or regression, as well as any other trained objective of the neural network. In varying embodiments, the neural network may be trained for acoustic and/or language recognition and/or translation, image recognition, identification, rejection, or discrimination, or battery characteristic monitoring or projection, as only non-limiting examples. Thus, based on the training data and desired interpretation objective, the architecture, selective connections between neighboring nodes and/or kernels, kernel elements, or other connections within layers may be varied during training until the neural network is trained to a desired acceptability for the desired interpretation objective. For example, in examples where the neural network is trained for image recognition, verification, or rejection, the neural network may include convolutional layers or be representative of a CNN, and thus the respective convolutional kernel elements, e.g., for varying feature extractions through feature kernels, may be trained to an original desired acceptability for the image recognition, verification, or rejection operations. The neural network may also be of a different type of neural network and merely include one or more convolutional layers, e.g., for selective feature extraction, for other objectives. Thus, herein, though embodiments may be discussed from the perspective of a CNN processing apparatus, such reference to CNNs is not intended to be limiting of the apparatus to only implementing CNNs or even to implement CNNs. Returning to the training of the neural network, the resultant kernels, kernel elements, and/or other connection weights of the trained neuro network may be referred to as parameters of the neural network, e.g., demonstrated as at least trained kernel elements of a convolutional layer or operation of the CNN. For example, the neural network may be trained based on the labeled input image information or desired corresponding output images, classifications, or geometric parameters, such as through a backpropagation or simulated annealing algorithms. In the training, example connection weightings between nodes of different hidden layers may be recursively adjusted until the corresponding neural network model is trained with a desired accuracy rate or below a maximum error rate, for example. Likewise, during the training, example kernels, kernel elements, or connection weightings between nodes within respective layers may be adjusted in the recursive adjusting. The respectively trained neuro network may be stored in a memory of the training or recognition apparatus, for example. In examples, the trained neural network may be stored in trained vectors, matrix or matrices, or other formats, e.g., where elements of the vectors, matrices, or other formats represent or suggest the corresponding trained parameters, e.g., trained kernels, kernel elements, and/or other weighted connections, of the corresponding neural network structure. The stored trained neural network may further include hyper-parameter information, which may define the specific structure or architecture of the corresponding neural network for which the example stored trained parameters correspond to. The hyper-parameters may define the architecture or structure of the inputs and output layers as well as how many hidden layers there are and the function and structure/architecture of the respective hidden layers, such the respective arrangement and which are fully connected, recurrent, convolutional, de-convolutional, or pooling layers, as only examples. The hyper-parameters may further include information of the configuration and values of any bias and/or contextual nodes in the neural network, corresponding activation functions of the nodes, types of nodes, such as long short-term memory nodes, and define any or any further recurrent structures of the neural network, which may vary depending on embodiment and interpretation objective of the trained neural network.

Accordingly, before or during operations of FIG. 1, the CNN processing apparatus may acquire such trained parameters. In the present disclosure, a frequency of parameters may refer to a number of parameters, e.g., a number of the parameters that exist for an acquired layer. In addition, as noted and only as non-limiting examples, the parameters of the acquired layer may correspond to respective connection weights between a previous input or hidden layer and a current hidden layer of nodes, kernels, kernel elements, and/or other connection weights between nodes within a layer, or respective connection weights between a current layer and subsequent hidden or output layer of nodes. Respective kernels may correspond to, or provide, different feature extractors or discriminators in a convolutional layer, for example. In some layers some kernel elements or connection weights may also be shared by multiple nodes, such as kernel elements being available to be respectively shared or reapplied during each feature extraction or discrimination in a convolutional layer. The parameters will have various values based dependent on the training process, so the trained neural network has a unique and specialized configuration The CNN processing apparatus may also be implemented only through a specially configured hardware module or implemented through hardware and instructions stored in/on non-transitory media, e.g., of or exterior to the CNN processing apparatus, that, when executed by one or more processors of the hardware, for example, cause the processor to implement any, any combination, or all of the operations described herein.

The CNN processing apparatus may adaptively select an operation mode for each of the convolution layers of a trained CNN from the first operation mode and the second operation mode. The first operation mode may reuse trained kernel(s) of the convolution layer to perform an operation, which is also construed herein as a calculation or a computation. The second operation mode may reuse the input of the convolution layer to perform an operation. Examples of the first operation mode will be described with reference to at least FIGS. 3, 4, 7A, 7B, and 7C, and examples of the second operation mode will be described with reference to at least FIGS. 3, 5, 8A, and 8B.

The reusing of a kernel means that a convolution operation of a convolution layer loads the kernel from a general memory, e.g., a database, to a local buffer/memory, and repetitively accesses that local buffer/memory to perform the convolution while values of the input or output channels from a previous layer may be repetitively loaded, e.g., loaded multiple times, from the general memory as need for the convolution. The reusing of an input means that a convolution operation of a convolution layer loads one or more of the values of the input (or the values of the output channels from the previous layer) from the general memory, e.g., the database, to a local buffer/memory, and repetitively accesses that local buffer/memory to perform the convolution while the values of the kernel may be repetitively loaded, e.g., loaded multiple times, from the general memory as need for the convolution. As noted above, with such a convolutional layer, values of the kernel represent trained kernel elements, e.g., trained for a particular objective, such as feature extraction or discrimination. Thus, the CNN processing apparatus may select between loading the kernel for reuse and loading the input for reuse, respectively from the example database. For example, the loading of the kernel to the local buffer/memory may mean that all kernel elements of the kernel are loaded to the local buffer/memory, and the loading of the input may mean that all values of the input are loaded to the local buffer/memory, though embodiments are not limited thereto, as one or a select number or group of kernel elements of kernels may be loaded for independent reuse or one or a select number or group of input elements may be loaded for independent reuse, as only examples. The input elements or respective portions of input elements may be or refer to input values, but examples are not limited thereto. Also, kernel elements or respective portions of kernel elements may be or refer to connection weights, but examples are not limited thereto. Further, the example database may be embodied as the general memory included in the CNN processing apparatus or as/in an external device, for example, a server, that may be connected to the CNN processing apparatus through a wire or a network, or wirelessly.

Figure 2:
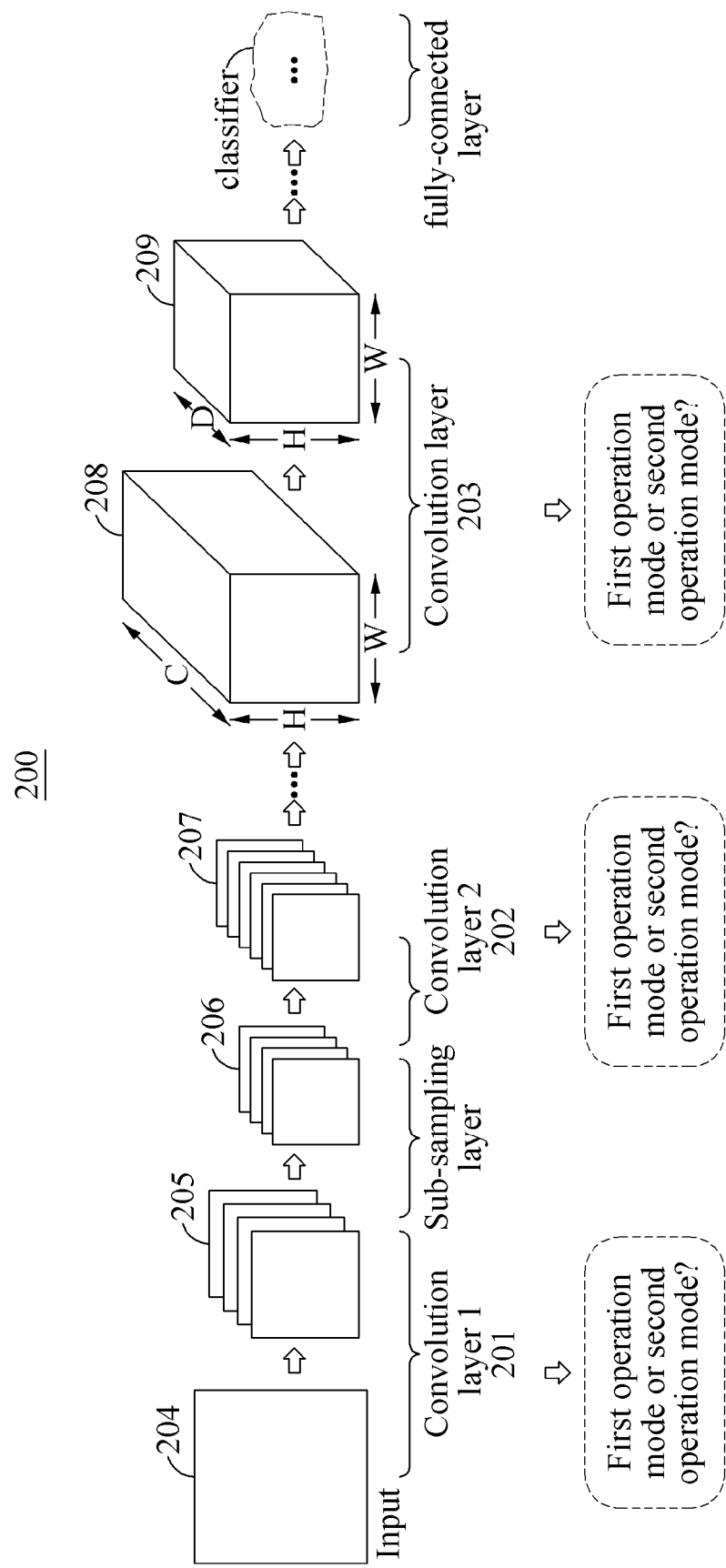
FIG. 2 is a diagram illustrating an example of a CNN.

FIG. 2 is a diagram illustrating an example of a CNN or DCNN. Thus, as only an example, in one or more embodiments, the trained neural network, e.g., the neural network with trained kernels, kernel elements, and/or other connection weightings between nodes within or between layers, may be a deep convolutional neural network (DCNN) with more than one hidden layer, and embodiments may further include the training of the DCNN based on a number of sample training images or other non-image training data with kernels, kernel elements, and/or other connection weightings being adjusted through multiple iterations, such as through backpropagation training, until the DCNN accurately recognizes input images or performs desired objectives. For example, the DCNN may have a LeNET-5 architecture, a Shift-invariant neural network architecture, neural abstraction pyramid architecture, or other architecture format. Still further, the DCNN may have a parallel architecture where convolutions are performed simultaneously in respective parallel layers, the results of which are ultimately combined in a subsequent same layer. Respective layers of the DCNN may be classified based on a function or operation of each layer, and the DCNN may include one or more convolutional layers configured to respectively generate, e.g., extractable or storable, features through respective convolutions performed on the input data, a pooling layer configured to perform abstraction to map a plurality of pixels or values from a previous layer to a lesser number of pixels or values, one or more further convolutional layers that respectively generate features through respective convolutions, further pooling layers, etc., and an example one or more fully-connected layers configured to classify, for example, features transferred from one or more previous layers. The fully-connected or dense layer may include one or multiple fully-connected or dense layers. There may be multiple convolution layers which respectively perform convolutional filtering, for example, on connected results from a previous layer, e.g., with the convolutional layers each outputting three-dimensional boxes or third-order tensors of plural feature images whose dimensions may depend on the kernel/filter size of the corresponding convolutional layer. In addition, there may be weighted connections to each convolutional layer in correspondence to each pixel of the corresponding convolutional layer and for each filter of the corresponding convolutional layer. Through convolution of multiple filters across the pixels in each convolution layer, due to the respective configurations of each convolution layer, distinguishing features of input (from the previous layer or input layer) example image may be recognized. The DCNN may further include multiple pooling layers that may each respectively downsample input pixels or three-dimensional boxes or third-order tensors from a previous layer, such as without weighting, for example. For example, a pooling layer may downsample a particular or each respective slice or channel of an input, e.g., the three-dimensional box or third-order tensor, to the pooling layer or may operate to down-sample the input to another three-dimensional box or third-order tensor that may have at least some different dimensional extents. Thus, the DCNN may have a complex architecture, where many parameters of the DCNN that can and may be varied during the training process until trained parameters and hyper-parameters of the DCNN with an acceptable error rate are found. Herein, when referring to a CNN, it is intended that this reference is with respect to CNNs and DCNNs, or any neural network with at least one convolutional layer or convolutional trained objective.

Accordingly, referring to FIG. 2, a CNN 200 includes a plurality of convolution layers, for example, convolution layer 1 201, convolution layer 2 202, and convolution layer 203. An example CNN processing apparatus may select respective operation modes for each of the convolution layers 201, 202, and 203, each selection being based on characteristics of the corresponding kernels of the convolution layers 201, 202, and 203 and the corresponding characteristics of the respective inputs to the convolution layers 201, 202, and 203, and thus the respective operation modes to be applied to each of the convolution layers 201, 202, and 203 may vary depending on their respective inputs and kernel(s) of each corresponding convolution layer.

An input of a convolution layer is data to be employed as an input to the convolution layer, e.g., data that is input to the CNN with one or more channels of information or data that is output by a previous layer of the CNN as one or more feature maps or channels. As only an example, in some examples, the input to the CNN may be image data that has a channel for each of red, green, and blue captured image colors, and potentially a channel for any captured infrared data. The data channels may be of the same dimensions, or made to have the same dimensions, e.g., representing the dimensions of the corresponding input image. In this example, as illustrated in FIG. 2, the one or more channel input data (e.g., the input image) may be input to the convolution layer 1 201 as an initial input 204 to the CNN 200, while an input 206 of the convolution layer 2 202 may be plural feature maps or channels output from a sub-sampling layer that follows the convolution layer 1 201. For example, each of the feature maps or channels of the input to the convolution layer 2 202 may correspond to a different kernel, e.g., for a different feature or discriminator extraction filtering than was applied in the convolution layer 1 201. Similar or same trained for discrimination, interpretative, or feature extraction objectives may also exist for different convolutional layers, though the respective kernels trained for the similar or same objective would typically include different trained values between convolutional layers, while also noting that kernels between convolutional layers may also be trained for different discrimination, interpretation, or feature extraction objectives. As noted, the input 206 of the convolution layer 2 202 may be result from, or be generated by, the sub-sampling layer based on an output 205 of the previous convolution layer 1 201. An input of the convolution layer 203 may thus be a feature map 208 of a size of W×H×C, e.g., where C may represent the number of slices or channels of the feature map 208. For example, C may correspond to the number of feature maps 208, e.g., as different feature map slices or channels of the illustrated feature map 208 or may represent the remaining slices or channels from feature maps generated by the previous convolutional layer when the feature map 208 is the result of a sub-sampling layer immediately previous to the convolutional layer 203. The feature map 208 may be a multi-ordered tensor for example, such as the example third-order tensor of FIG. 2. The CNN processing apparatus performs a convolution operation on the feature map 208 using one or more trained kernels of the convolution layer 203. As a result of the convolution operation of the convolution layer 203, a feature map 209 of a size of W×H×D is generated. Similar to above, in other examples, D may alternatively correspond to the number of kernels applied during the convolution of the convolution layer 203 and the number of feature maps that result from the convolution of the convolution layer 203. Each of the kernels may also have a dimensional depth of plural channels, e.g., when the dimensional depth of a kernel is three channels the kernel may correspond to a three-dimensional (3D) filter. For example, when an input to a convolution layer has three or more channels or three or more dimensions an example trained kernel applied in a convolution layer may have three or more slices or channels (or dimensions) of three or more. During training of the CNN, the values of each of the kernels and each of the slices or channels of the kernels may be trained, so when convolution of the kernel with an input is performed the same trained values of the kernel may be repeatedly used as the kernel is scanned across the input for each example channel.

Thus, a kernel of a convolution layer is employed to perform a convolution operation in the convolution layer, and there may be plural respective kernels applied in each convolutional layer, i.e., there may be a plurality of three-dimensional (3D) filters applied in each convolutional layer. For example, the convolution layer 203 may employ D example kernels, such as with each having respective C dimensions, so that each of the D examples kernels is applied of the feature map 208 of the size of W×H×C to apply the convolution operation, thereby generating the feature map 209 of dimensions W×H×D. As an output of a convolutional layer, the feature map 209 may thus have D slices or channels, e.g., each representing a separate feature map resulting from a corresponding kernel of the D kernels.

The CNN 200 includes the example convolution layers 201, 202, and 203, and each of the inputs 204, 206, and 208 will have respective characteristics and each of the kernels respectively applied during each corresponding convolution operation will have respective characteristics. For example, among other determinable characteristics, the sizes of the input or input feature maps may be different between convolutional layers 201, 202, and 203, and the respective number and sizes of filters applied in each of the convolution layers 201, 202, and 203 may differ. For example, the convolution layer 1 201 among the convolution layers 201, 202, and 203 may have a smallest convolutional depth, and the convolution layer 203 among the convolution layers 201, 202, and 203 may have a greatest convolutional depth, e.g., the number of kernels applied in the convolutional layer 1 201 is substantially less than the number of kernels applied in the convolutional layer 203. In such an example, a characteristic of a kernel of a convolution layer and a characteristic of an input of the convolution layer may be determined based on a depth of the convolution layer in the CNN 200.

The CNN processing apparatus adaptively selects one or more of the respective operation modes for each of the convolution layers 201, 202, and 203 based on determinable characteristics of the respective kernels and determinable characteristics of the respective inputs 204, 206, and 208 of the convolution layers 201, 202, and 203. Thus, in an example, such an adaptive selection may be selectively performed and result in different operation modes being implemented within any of the convolution layers 201, 202, and 203, only one of the operation modes being selectively implemented or not-implemented for all or select portions of any one of the convolution layers 201, 202, 203, or any combination of such selective implementations or non-implementations of the operation modes being selectively implemented within/for each or any combination of the convolution layers 201, 202, and 203. Thus, with the adaptive selection operation, the CNN processing apparatus may reduce a number of times data needed for a convolution operation is loaded, which is herein referred to as a data loading number, and reduce a number of times an operation, for example, a multiply-accumulate (MAC) operation, is performed which is herein referred to as an operation performing number, and thus reduce use of a memory and enable high-speed CNN processing. For each selected operation mode, the CNN may also select whether zero skipping is performed, as discussed in greater detail further below.

Referring back to FIG. 1, in operation 102, the CNN processing apparatus performs the convolution operation based on the selected one or more operation modes. The CNN processing apparatus may perform the respective convolution operations of one or more of the convolution layers based on a correspondingly selected operation mode, selected from the example first operation mode and second operation mode.

Hereinafter, an example of a convolution operation will be described with reference to FIGS. 3 through 5 with an example of the input 208 and the output 209 of the convolution layer 203 illustrated in FIG. 2.

Figure 3:
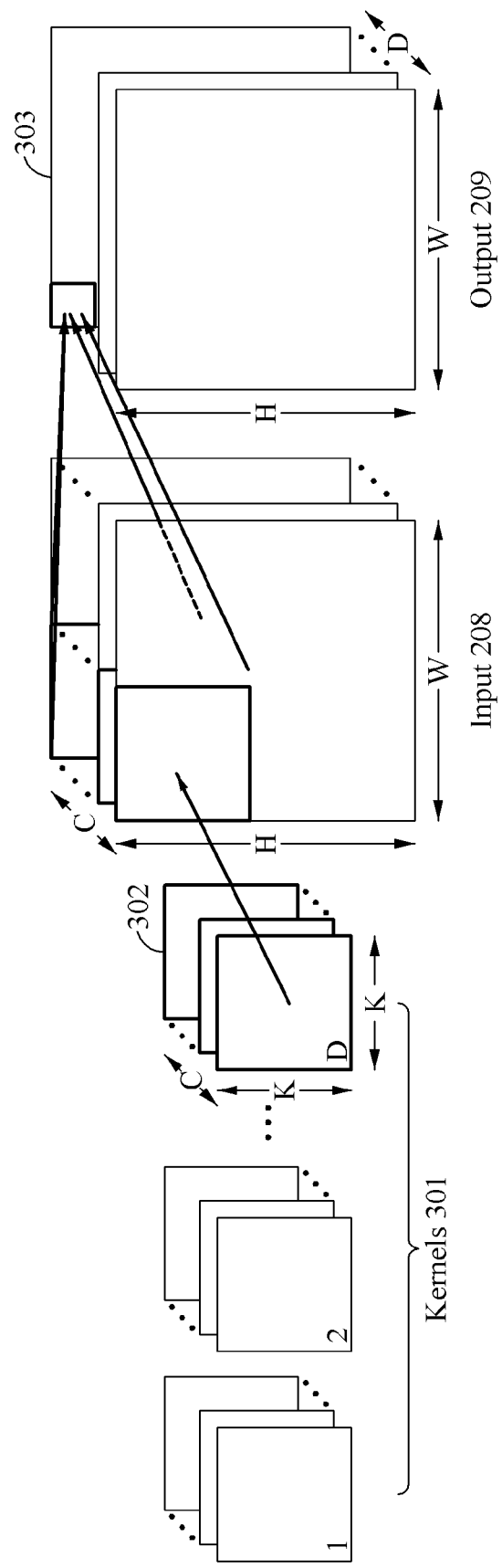
FIG. 3 is a diagram illustrating an example of a convolution operation.

FIG. 3 is a diagram illustrating an example of a convolution operation.

Referring to FIG. 3, the CNN processing apparatus selects an operation mode corresponding to the convolution layer 203 based on a characteristic of kernels 301 and a characteristic of the input 208. The kernels 301 are employed to perform convolution operations in the convolution layer 203, and includes D kernels (or filters). A size of each kernel/filter is K×K×C, and thus an overall size of the kernels 301 can be seen as K×K×C×D. The kernels 301 may be stored in a memory of the CNN processing apparatus, for example, in a main memory or database as separate matrices or tensors or collectively as a single matrix or tensor. The kernels 301 are also trained kernels, each including respectively trained kernel elements, derived during a training operation of a corresponding CNN.

As noted above, the size of the input 208 may be W×H×C, with C indicating that the input 208 includes C pieces, slices, or channels of data of which a size of each piece, slice, or channel is W×H. As noted above, respective pieces, slices, or channels of data may correspond to feature maps or channels resulting from different previous D' kernels that were applied in a previous convolutional layer, or correspond to a sub-sampling of such feature maps. Here, though a collection of pieces of information, and correspondingly potentially a collection of feature maps, the input 208 will collectively also be referred to herein as a feature map. The input 208 may also include padding, and thus may also be considered a feature map to which padding of a particular 'pad' size has been applied. The padding refers to a method of filling a portion of an input with a certain value. The portion may be generally an edge, but examples of the portion are not limited thereto. Applying of padding to an input using a pad of a size of 1 refers to filling a certain value, for example, zero, in an edge of each frame of a feature map, and thus such zero padding would refer to applying the padding by setting the value to be zero. For example, when the zero padding using a pad of a size of 1 is applied to an input of a size of X×Y×Z, an edge of the input to which the padding is applied may be data of which an edge is zero and a size is (X+1)×(Y+1)×Z. If such a feature map is alternatively considered as a collection of Z feature maps, each having two-dimensional (2D) sizes of X×Y, then merely the outer periphery of each of the Z 2D feature maps may be padded with zeros. The padding may be implemented by a previous layer, for example, such as a previous sub-sampling layer or performed by the example convolutional layer 203.

In one or more embodiments, when an operation mode is selected, the CNN processing apparatus performs filtering on the input 208 using the example D filters, again noting that each of the D filters may also be multi-dimensional filters, and generates the output 209 from a filtering result corresponding to each of the D filters. Referring to FIG. 3, the filtering is performed on the input 208 by each of the D filters having a size of K×K×C, and thus a number of filtering results of which a size of each filtering result is W×H may be D, resulting in the output 209 having a size of W×H×D.

The output 209 may thus include the D filtering results as respective output slices or channels. When the output 209 is considered as an input to a subsequent layer, the output 209 may also be understood to have C' channels (e.g., D=C'). Thus, in an example, the filtering may be performed on the input 208 of the size of W×H×C by a D-th filter 302 of the size of K×K×C, and a filtering result 303 of the size of W×H may be generated. Each slice or channel of the D-th filter may be considered as corresponding to a different channel of the input 208, and thus each may be respectively matched to a corresponding channel (of C channels) of the input 208 for respective convolution operations. Accordingly, the D-th filter 302 may include C trained weight maps, and a size of each of the weight maps may be K×K. Thus, the D-th filter 302 may be considered as being a three-dimensional (3D) or third-order tensor kernel/filter. Briefly, as noted above, a previous convolutional layer may have performed a convolution of a corresponding input by applying corresponding D' or C kernels, which after sub-sampling, would have resulted in the example input 208 W×H×C dimensions, so if the input 208 is merely an output of a previous convolutional layer (or if an intermediary sub-sampling layer does not adjust the number of channels) then the previous convolutional layer would have applied C kernels and the input 208 would have resulted with a corresponding C feature maps each of W×H dimensions, now represented as input 208 with W×H×C dimensions. For the convolution, the CNN processing apparatus may slide, in accordance with a set convolutional stride, each weight map of the size of K×K over each frame or channel of a size of W×H included in the input 208, and generate the filtering result 303, e.g., as the D-th channel of output 209, obtained from the D-th filter 302 and the input 208. The convolutional stride refers to an interval of sliding a weight map in a convolution operation, such as the weight map being slid or rasterized across an input frame or channel. In addition, in the example with the D-th kernel having C weight maps each of size K×K, and the input 208 having C slices or channels each of size H×W, same slices or channels of the D-th kernel will be applied to same slices or channels of the input 208 in respective convolution operations, and the results of each corresponding convolutions then combined, e.g., through summation, to form the feature map 303 of the output 209. For example, the illustrated top slice or channel, e.g., the slice or channel (X, Y, 1), of the D-th kernel may be applied to the top slice or channel, e.g., the slice or channel (X, Y, 1), of the input 208 in a convolution operation and result in a preliminary result of the D-th slice or channel, e.g., the slice or channel (X, Y, D), of output 209, which may also be summed with a preliminary result of the illustrated weight map 302 of the D-th kernel applied to the bottom slice or channel, e.g., the slice or channel (X, Y, C), of the input 208 in a corresponding convolution operation, representing an updating of the feature map 303 of output 209. Such updatings of the output 209 may be performed for all slices or channels of the input 208 and all slices or channels of each of the filters to generate a final or ultimate output 209.

In general or typical, in a case of performing a convolution operation at a convolutional stride of 1 using kernels like the kernels 301 of an overall size of K×K×C×D and an input like the input 208 of the size of W×H×D, each kernel/filter may typically be respectively slid over the input W×H times, and thus, each of the kernels may typically be loaded repeatedly W×H times, i.e., each kernel may typically be loaded separately for each multiplication with a corresponding portion of the input as that corresponding portions is slid across the input in accordance with the set convolutional stride. Thus, typically data of the kernel elements of the kernels may be loaded for a total of K×K×C×D×W×H times because the respective data of the kernels of the overall size of K×K×C×D may be loaded repeatedly by W×H times. In addition, when the kernels are slid across the input in a convolution, typically respective data of the input may be loaded repeatedly by K×K times, which is the size of each weight map, and loaded repeatedly by D times, where D is the number of the kernels/filters, for example, which may control the number of the channels of the output 209 to also be D. Thus, for typical convolution operations, the respective input elements of the input may be loaded by a total of K×K×C×D×W×H times because the respective input elements of the input of the size of W×H×C is loaded repeatedly by K×K×D times. Here, a data loading number to perform the typical convolution operation may accordingly be 2×K×K×C×D×W×H, which is a sum of a loading number of the kernels and a loading number of the input. An embodiment may include the CNN processing apparatus selecting whether to implement such a typical convolution operation, or one or more alternative operation modes discussed herein.

In an example, when performing a convolution operation based on a selected alternative first operation mode, the CNN processing apparatus may perform convolution with a reduced data loading number and operation performing number by reusing the kernels 301, e.g., loading the kernels 301 collectively, or each of the kernels 301, once into a local or temporary buffer/memory from a general memory or database and using the locally stored kernels 301 during convolution that otherwise would include reloading the input 208 or portions of the input 208 repetitively from the general memory or database. The first operation mode may also be considered to be a performance of the convolution from the respective perspective of each of the trained kernel elements of the kernels 301, e.g., considering which or all input elements are eventually multiplied by a particular trained kernel element during a convolution operation between a corresponding kernel and the input 208. For example, the first operation mode may include independently applying or reusing respective portions of kernel elements of a kernel, e.g., less than all kernel elements of a channel of the kernel, to separate repeated collections of input elements of the input. An example of such a first operation mode will be described with reference to FIG. 4. In another example, when performing a selected alternative convolution operation based on a second operation mode, the CNN processing apparatus may also perform convolution with a reduced data loading number and operation performing number by reusing the input 208, e.g., loading the input 208 or portions of the input 208 once into a local buffer/memory from the general memory or database and using the locally stored values of the input 208 during convolution that otherwise may include reloading the kernels 301 or portions of the kernels 301 repetitively from the general memory or database. The second operation mode may also be considered as a performance of the convolution from the respective perspective of each of the values, elements, or portions of the input 208, e.g., considering which or all trained kernel elements of the kernels 301 are eventually multiplied by a particular value, element, or portion of the input 208 during the convolution operation between a corresponding kernel and the input 208. For example, the second operation mode may include independently applying or reusing respective portions of the input, e.g., less than all input elements of a channel of the input, to separate repeated collections of kernel elements of a kernel. An example of the second operation mode will be described with reference to FIG. 5.

Herein, described temporary buffers/memories may be of general purpose memory, or in an example the temporary buffers/memories may be a memory of a dedicated or secure process, processor, or processing component of the CNN processing apparatus, such as where a limited Trust Zone of a CPU processor of the CNN processing apparatus is utilized to implement a corresponding neural network for a trained objective of the example CNN or a dedicated or secure processing element/component separate from such CPU processors is utilized to implement the corresponding neural network. As only an example, such limited Trust Zone of the example CPU processor or dedicated or secure processing element/component for example may be implemented when private information is being interpreted or interpreted for, such as in fingerprint or image verification embodiments. Such limited Trust Zones of a CPU processor or such dedicated or secure processing element/component may typically have limited memory resources and/or processing capabilities, and thus, one or more examples may be used with such limited Trust Zones or dedicated or secure processing element/component examples to implement objectives of a trained neural network with reduced resources and/or processing complexities. As noted above, non-limiting examples of such trained objectives may be for bio-information, bio-image, facial, or voice verifications, bio-information, bio-image, facial, speech, image, scene, or situation recognitions, or any other non-limiting alternative objectives. For example real-time recognition or verification with such alternative operation examples discussed herein may be available with less computing resources and/or processing requirements, such as where such computing resources and/or processing capabilities are limited, providing further alternative operation examples of technological improvements of the examples herein over instances where such trained neural network are normally implemented without the aforementioned alternative operation example first and second modes of operation, as only examples.

Figure 4:
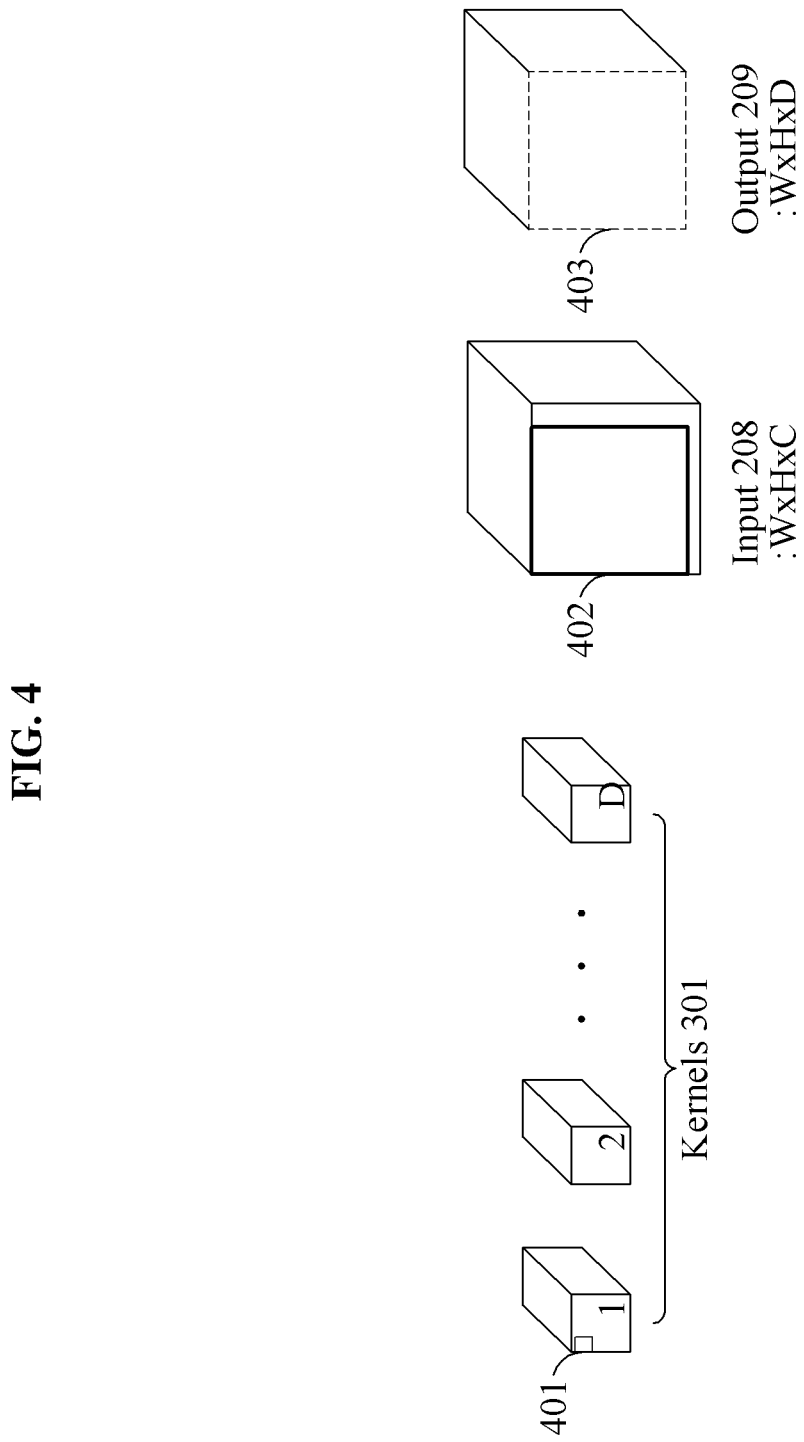
FIG. 4 is a diagram illustrating an example of a first operation mode.

FIG. 4 is a diagram illustrating an example of the first operation mode. The first operation mode may also be referred to as a kernel reusing mode.

In one example, the CNN processing apparatus may perform a convolution operation by loading kernel elements included in the kernels 301 and reusing the loaded kernel elements, e.g., reusing from a local or temporary buffer/memory that the kernel elements are stored. Referring to FIG. 4, the CNN processing apparatus loads a kernel element 401 included in the kernels 301. The kernel element 401, along with other kernels of the kernels 301, may be stored in a main or general memory or database for example, and the CNN processing apparatus may load the kernel element 401 from the main/general or database to the local or temporary buffer. The CNN processing apparatus loads input elements 402 corresponding to the loaded kernel element 401 among a plurality of input elements included in the input 208, based on first information specifying which of the input elements 402 correspond to the loaded kernel element 401 for the convolution operation. For example, a temporary buffer/memory may be allocated for the input elements 402, and the loaded input elements 402 may be temporarily stored in the temporary buffer. Similar to the kernels 301, the input 208 may be loaded from a main or general memory or database, or made available or provided from a sensor, e.g., an image sensor, for example. The CNN processing apparatus performs an operation between the loaded kernel element 401 and the loaded input elements 402. In this example, as the loaded kernel element 401 in the convolution operation may be applied to a portion of the input 208 as the corresponding kernel is slid over the input 208, depending on the size of the kernel and the convolutional stride of the convolution, the loaded input elements 402 are illustrated as being less than all of the W×H input elements in a front slice or channel of the input 208.

The CNN processing apparatus updates, among a plurality of output elements included in the output 209, output elements 403 to which results of the operation between the loaded kernel element 401 and the input elements 402 are mapped, based on second information specifying the output elements 403, e.g., for the particular kernel. The CNN processing apparatus updates the output elements 403 using the results of the operation between the loaded kernel element 401 and the loaded input elements 402. The CNN processing apparatus then incrementally update the output elements 403, as well as remaining output elements of output 209, as other kernel elements are loaded and applied to the input 208. The results of the operations may be temporarily stored in a temporary buffer/memory, for example, until respective final values of each of the slices or channels the output 209 are determined or until all final values are determined for all such slices or channels of the output 209, and then stored to the main or general memory or database, and/or merely provided as an input to a next neural network layer operation.

In the first operation mode, the first information may specify which input elements correspond to the kernel elements included in the kernels 301 among all input elements included in the input 208. For example, not all kernel elements may be applied to all input elements, depending on the convolution operation. The first information may be determined based on locations of the kernel elements included in the kernels 301, a size of K×K×C×D of the kernels 301, respective convolutional strides for the kernels 301, and a size of W×H×C and a pad or padding of the input 208. For example, in a case that a size of the input 208 to which padding has been applied is W×H×C, and the convolutional stride is 1, the first information may specify that the select input elements 402 correspond to the kernel element 401, among all input elements in the input 208, for the convolution of the particular kernel element 401, based on a location of the kernel element 401.

In the first operation mode, the second information may specify, among the output elements included in the output 209, to which output elements respective results of the operations between the kernel elements and the specified input elements are mapped. The second information may be determined based on the locations of the kernel elements included in the kernels 301 and locations of the input elements specified by the first information. For example, the second information may specify the location of the kernel element 401 and the output elements 403 to which the results of the operation between the kernel element 401 and the input elements 402 are mapped. The output elements 403 may be updated as the results of the respective operations associated with the kernel element 401 are performed, and thus the output elements 403 are depicted by a broken line in FIG. 4 because the output elements 403 may be temporary or preliminary results and not the final output.

The CNN processing apparatus may perform operations associated with the loaded kernel element 401 and particular input elements and reflect the preliminary results thereof in the output elements 403, and then loads a subsequent kernel element. For example, in view of the subsequently loaded kernel element, the CNN processing apparatus may then load those input elements corresponding to the loaded subsequent kernel element based on the first information. The CNN processing apparatus thus updates output elements to which preliminary results of the operations between the loaded subsequent kernel element and the correspondingly loaded input elements are mapped, based on the second information. The CNN processing apparatus may alternatively load multiple kernel elements at one time with loadings of the respective specified input elements, and perform the convolution of each particular kernel with the input 208 in parallel. Thus, in an example, multiple kernels may be similarly processed in parallel based on the respective first and second information. In the first operation mode, the CNN processing apparatus may load, only once for example, each of the kernel elements included in the kernels 301 into the local or temporary buffer, for example. When performing the convolution operation, the CNN processing apparatus reuses the loaded kernel element a number of times corresponding to a number of input elements that the kernel element operates on for the convolution of the loaded kernel element with the input 208. For example, in the first operation mode, the CNN processing apparatus may need to load the kernel elements of kernels 301 only once, and thus a loading number of kernel elements of the kernels 301 may be K×K×C×D, for example, the size of the kernels 301. In the first operation mode, the CNN processing apparatus may also perform K×K×D loadings of input elements of the input 208 for each of the convolution of the kernels 301, resulting in, in a case of a convolutional stride being 1, a loading number of loadings of the input elements of the input 208 being K×K×C×D×W×H as the respective kernels are slid across the input 208 in W×H unit steps according to the convolutional stride of 1. In such a case, a data loading number in the first operation mode, hereinafter simply referred to as a first data loading number, would be K×K×C×D(1+W×H) compared to the aforementioned typical convolution process that has a data loading number of 2×K×K×C×D×W×H, and thus the CNN processing apparatus may reduce of a data loading number by using the first operation mode.

Still further, in one or more embodiments, the first operation mode may further include the CNN processing apparatus being configured to determine whether or any of the kernel elements of the loaded kernel element 401 have values of zero. For example, when the loaded kernel element is a single connection weight value, and in response to the loaded kernel element 401 having a value of zero, the CNN processing apparatus may be configured to skip loading of the appropriate input elements 402 corresponding to the kernel element 401 or merely skip all operations associated with the kernel element 401. In addition, the CNN processing apparatus may be configured to determine whether a loaded input element has a zero value, and in a case of the loaded input data has a zero value, of the CNN processing apparatus may skip additional loading or operations associated with the input data that is determined to have the zero value. Herein, such skipping of operations or operations and loadings based on known or determined zero values of the kernel elements and/or input elements is referred to herein as zero skipping. Accordingly, in such an example, the CNN processing apparatus may further reduce the first data loading number using the zero skipping. For example, in a case that a number of kernel elements having values of zero among kernel elements included in a kernel is $Z_k$, the CNN processing apparatus may skip loading of input elements corresponding to the kernel elements having zero values, and thus a loading number of the input 208, in a case of a convolutional stride being 1, is $W \times H \times (K \times K \times C \times D - Z_k)$. In such a case, the first data loading number is $K \times K \times C \times D + W \times H \times (K \times K \times C \times D - Z_k)$, and the CNN processing apparatus skips operations associated with the $Z_k$ kernel elements through the zero skipping. In another example, implementation instructions for such convolutional operations may further be configured so there is a selective provision or loading of only those kernel elements that are initially determined by the CNN processing apparatus, for example, as being non-zero, to parallel processing elements of the CNN processing apparatus that are configured to implement convolutional operations based upon provided parameters or instructions, so selective loading of input elements and loading of zero kernel elements can further be avoided.

Figure 5:
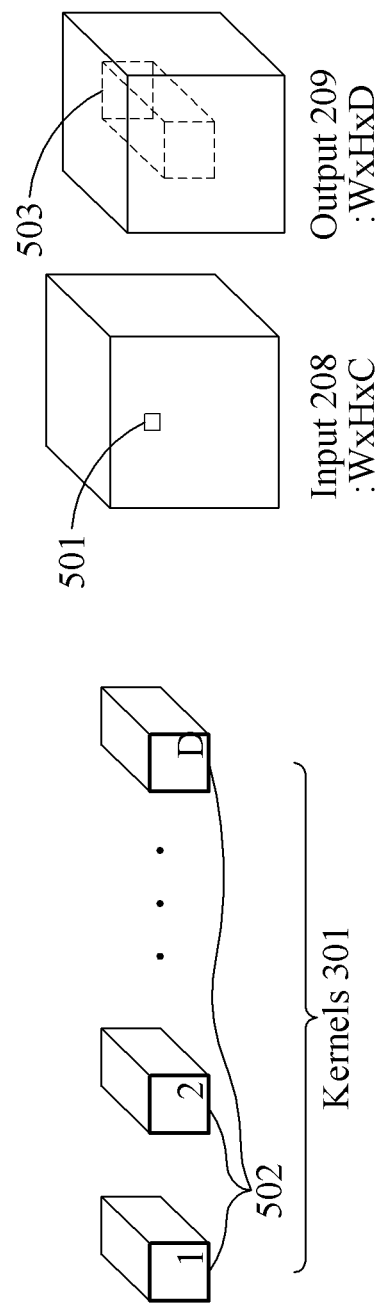
FIG. 5 is a diagram illustrating an example of a second operation mode.

FIG. 5 is a diagram illustrating an example of the second operation mode. The second operation mode may also be referred to as an input reusing mode.

In one example, the CNN processing apparatus may perform a convolution operation by loading input elements included in the input 208 and reusing the loaded input elements. Referring to FIG. 5, the CNN processing apparatus loads an input element 501 included in the input 208. For example, the input element 501 may be single channel value of the input 208, or at least less than all of a single channel of the input 208, and the input elements may be respectively loaded and stored in allocated temporary buffers/memories. The CNN processing apparatus loads kernel elements 502 corresponding to the loaded input element 501 among a plurality of kernel elements included in the kernels 301, e.g., as needed or repeatedly needed during the convolution operation, based on first information specifying the kernel elements 502. For example, for each of kernels 1, 2, through D a corresponding weight map or weight channel may be loaded and stored in a temporary buffer/memory allocated for the respective kernels or weight maps/channels, the corresponding weight map/channel may be for the same/corresponding channel in which the loaded input element 501 is loaded with respect to. As another example, the loaded element 501 may also be a first order tensor having a dimensional depth of C. The CNN processing apparatus performs convolution operations between the loaded input element 501 and the loaded kernel elements 502, thereby obtaining output elements 503 that have dimensions corresponding to the dimensions of the loaded kernel elements 502 and D the number of loaded kernel elements, e.g., thereby providing preliminary output values for a corresponding portion of the output 209 for multiple channels. For example, preliminary first/front slice or channel values of the output elements 503 may be derived from, or dependent on, the convolution of kernel 1 and the loaded input elements 501, while preliminary last/back slice or channel values of the output elements 503 may be derived from, or dependent on, the convolution of the kernel D and the loaded input elements 501.

In this example, the results of the convolution of the loaded kernel elements 502 and the input elements 501, even in the example where the input elements 501 are a tensor having a dimensional depth of C, the resulting values will have dimensions dependent on the dimensions of the kernels 301 and/or the input elements 501, which are less than $W \times H$ or less than $W \times H \times C$, and, with examples including multiple different input elements and kernel convolutions being performed at one time, it may be beneficial to identify what ultimate values the preliminary results of the particular convolution of the input elements 501 and the kernel elements 502 correspond or are matched to in the output 209. Thus, the CNN processing apparatus updates output elements 503 to which respective preliminary results of the convolution operations between the loaded input element 501 and each of the kernel elements 502 are mapped in the output 209, as well as updating other output elements that may overlap in the output 209 with respective other preliminary results of other convolution operations between the respective other loaded input elements and each of the kernel elements 502 are mapped in the output 209, e.g., based on second information specifying which output elements are to be updated with each convolution or sets of convolutions. As one example, for the convolution operations with input elements 501, such second information could be original location indicating information of the loaded input elements 501, which can also be used to indicate where the preliminary results of the convolution operations between the input elements 501 and the kernel elements 502 are to be mapped to in the output 209. More detailed examples will be provided further below. Thus, the CNN processing apparatus updates the output elements 503 using the preliminary results of the convolution operations between the loaded input element 501 and the loaded kernel elements 502, with these results being indicated as being preliminary because the ultimate results for any value in the output 209 may depend on a combination of multiple such convolution operations with different input elements from input 208.

As explained above, in the second operation mode, the first information may specify which kernel elements, e.g., which kernels and/or which respective kernel channels, of kernels 301 are loaded for a corresponding convolution operation with particular input elements included in the input 208. As noted, the first information may be determined based on channel locations of the input elements, each set of input elements respectively being considered a pad, included in the input 208 having a size $W \times H \times C$. The first information may also, or alternatively, be dependent on the collective or respective dimensions of the kernels 301, e.g., having a collective size of $K \times K \times C \times D$, an example stride that is implemented for respective convolutions with respect to each of the kernels, and/or the dimensions or size of the input elements and/or the size of the input 208. For example, in a case that a size of the input 208 to which padding is applied is $W \times H \times C$, with C denoting the total number of channels in the input 208, and the stride is 1, the first information may specify or thereby imply to the CNN processing apparatus which of the kernel elements, e.g., kernel elements 502, among the kernel elements in the kernels 301 should be used or loaded and used for the convolution operation with respect to the particular input element, e.g., input element 501, based on a channel location of the input element 501. For example, obtained location information of the input element 501 as some example first information may indicate which channel of the input 208 the loaded input elements correspond to, which may indicate which channel of each of the kernels 1, 2, through D will be loaded as the kernel elements used for the corresponding convolutions with the loaded input elements, e.g., the location information may be (W', H', 1) corresponding to the location (or central location) of the input element 501 at (W',H') in the first slice or channel of the input 208, and thereby also indicate that the first slice or channel of each of the kernels 1, 2, through D-th will be used in the convolution of the input element 501.

In the second operation mode, the second information may specify the mapping of output elements, among all output elements included in the output 209, for the preliminary results of the corresponding convolution operation between the particular input elements and the specified kernel elements. As noted above, the convolutional preliminary results may be of a lesser size than the size of the output 209, so the second information may indicate where in the output 209 the convolutional preliminary results should be mapped to. For example, the second information may indicate a central location of a portion of the output 209 where particular preliminary convolutional results are mapped, and when the output 209 has the same W×H dimensions as the input 208, that central portion may also merely be identical to the original location of the corresponding input elements, or original central location of the corresponding input elements in the input 208, with which the corresponding convolution operation was performed. Thus, the second information may be determined based on locations of the input elements included in the input 208 and locations of the kernel elements specified by the first information. For example, in addition to the location of the input element 501 being specified or identified, the second information may indicate which kernel the corresponding preliminary convolutional results are derived from, which may dictate to which output slice or channel of the output 209 the preliminary convolutional results are to be mapped to. For example, as noted above, convolution between the input 209 and the kernels 301 may result in a separate feature map dependent on which kernel was applied during the convolution, i.e., convolution between the input and the kernel 1 may result in a first feature map, or a first slice or channel in output 209, while convolution with kernel D may result in the final or D-th feature map or D-th slice or channel in output 209. The output elements 503 are thus updated by each of the preliminary results of the different convolution operations associated with each of the input elements over the input 208 until all convolution operations have been performed, and thus the preliminary output elements 503 are depicted by a broken line to demonstrate that these preliminary output elements 503 with respect to input elements 501 may not be the ultimate or final output values of the output 209.

Though the CNN processing apparatus may load the entire image 208 at one time from the general memory or database, the CNN processing apparatus may also selectively particularly load the input element 501, distinguished from other input elements or the entire remainder of the input 208, perform the operations associated with the loaded input element 501, store the corresponding preliminary convolutional results in a temporary buffer/memory of the CNN processing apparatus, and then load a subsequent input element. In another example, the CNN processing apparatus may respectively load plural input elements in parallel and perform parallel convolutional operations, the respective results of which may be combined or summed, such as through the temporary buffer, to generate the ultimate or final values of the output 209. In an embodiment, the CNN processing apparatus may respectively load plural input first order tensor elements, e.g., input elements of dimensional depth of C, and also perform such parallel convolutional operations, e.g., using also loaded similarly additionally dimensioned kernel tensor elements. The CNN processing apparatus may load the respective kernel elements, e.g., as needed, corresponding to the loaded subsequent input element based on the first information. For example, based on known previous, current, or subsequent convolutional processes that are to be performed or are being performed, and corresponding determined first information for each convolutional process, the CNN processing apparatus may preload or load during the corresponding convolutional processes the necessary kernel elements. The CNN processing apparatus updates output elements to which preliminary convolutional results between the loaded input elements and the loaded kernel elements are mapped, based on the second information. In the second operation mode, the CNN processing apparatus may singularly load once each of the input elements from the whole of the input 208, singularly load a set or divisible set of input elements from the whole of the input 208, or singularly load the entire input 208 and perform parsing or selective accessing of the same from the local buffer/memory to perform each of the convolutional processes.

As explained above, when performing a typical convolution operation, a typical convolutional process would require the reloading of the input or each slice or channel of the input a number of times corresponding to the number of kernels. Rather, for example, in the second operation mode according to one or more embodiments, the CNN processing apparatus may load the particular input elements in the input 208 only once, and thus a total loading number of all values of input elements of the input 208 is W×H×C, for example, a size of the input 208. In the second operation mode, the CNN processing apparatus may load each of the kernel elements in the kernels 301 repeatedly by W×H times, e.g., in a case of a stride being 1 meaning that respective convolutions include each kernel being slid across the input in steps of 1, resulting in a loading number of the trained kernel elements of the kernels 301 being K×K×C×D×W×H. In such a case, a total data loading number in the second operation mode, hereinafter simply referred to as a second data loading number, is W×H×C(1+K×K×D), and thus the CNN processing apparatus may reduce a data loading number by using the second operation mode compared to the aforementioned typical convolution process that has a data loading number of 2×K×K×C×D×W×H.

Still further, in one or more embodiments, the second operation mode may further include the CNN processing apparatus being configured to determine whether or any of the loaded input element 501 have zero values. For example, when the loaded element 501 is a single value of the input 208, and in response to the loaded input element 501 being determined to have zero values, the CNN processing apparatus may be configured to skip loading of the appropriate kernel elements 502 corresponding to the input element 501 or merely skip all operations associated with the input element 501. Here, with such example skipping operations, no preliminary convolution output results may be generated for the input element 501, and thus further operations of combining such preliminary results from the convolution with respect to the input element 501 with other preliminary results for other input elements may also be skipped or not performed. Accordingly, in such an example, the CNN processing apparatus may further reduce the second data loading number using the zero skipping. For example, when a number of input elements included in an input having zero values is $Z_i$, the CNN processing apparatus may skip loading kernel elements corresponding to those input elements that have zero values, and thus, in a case of a stride being 1, a loading number of the kernels 301 is K×K×D×(W×H×C−$Z_i$). In such an example, the second data loading number is W×H×C+K×K×D×(W×H×C−$Z_i$), and the CNN processing apparatus may skip operations associated with the $Z_i$ input elements through the zero skipping. In another example, implementation instructions for such convolutional operations may further be configured so there is a selective provision or loading of only those input elements that are initially determined by the CNN processing apparatus, for example, as being non-zero, to parallel processing elements of the CNN processing apparatus that are configured to implement convolutional operations based upon provided parameters or instructions, so selective loading of kernel elements and loading of zero input elements can further be avoided.

In an example CNN implementation, within the neural network structure, an input element being made to be zero among a plurality of input elements in an input may be caused by a rectified liner unit (ReLU) function that is employed as an activation function of a convolutional layer of the CNN or of a layer immediately after such a convolutional layer. In a case that a ReLU is employed by a middle convolution layer of the CNN, such as the example convolutional layer 2 202 of FIG. 2, the output of the middle convolution layer (or said another way, an input of a subsequent convolution layer with or without a sub-sampling layer between the convolutional layers) may include input elements having zero values. Typically, hidden and output layers of neural networks include activation functions, such as non-linear tanh or sigmoid functions, that operate immediately after a summing or other operation on trained connection weights applied to outputs from a previous layer for introducing non-linearity properties of the neural network. An ReLU activation function may be used in the convolutional layers of CNNs to introduce such non-linarites with improved back-propagation results and training speeds over tanh and sigmoid functions in CNNs. The ReLU function may be represented by $F(x)=\max(0, x)$, in which for a convolutional layer x denotes a convolution result and $F(x)$ denotes an output value by the ReLU function. Such an example convolution result that is a negative value may accordingly be output as zero by the ReLU function. Trained kernel elements of a trained convolution kernel may follow a normal distribution, while a convolution result with respect to an input image may be probabilistically a negative value by 50% and a positive value by 50%, and thus, if the ReLU function is implemented as an activation function of a convolutional layer then 50% of the convolutional results may be zero.

In one example, an input element having a zero value among a plurality of input elements in an input may also be generated by up-scaling that may be used in a process of a CNN. The up-scaling may be used to increase a resolution of an input. For example, through the up-scaling, new pixels may be generated, such as through interpolation, repetition, or extrapolation, as only examples, around each pixel or groups of pixels included in the input. The up-scaling may also include a super-sampling operation, may be performed differently for different channels, may include generation of sub-pixels, etc. A CNN example may thus include one or more convolutional layers, each of which may be followed by a sub-sampling layer, as well as one or more convolutional layers that may be followed by a scaling layer, the differing combinations of convolutional/sub-sampling layers and convolutional/scaling layers may be configured in different orders and there may further be one or more of such different combinations which may also be led, separated, and/or followed by other layer types, such a recurrent, fully connected, densely connected, or other layer types. In such an example with a scaling layer, and as a result of the scaling operation, some new pixels generated by the scaling layer may have resulting values of zero. For example, for an example trained image segmentation objective of a sampling layer of the CNN, a resulting resolution of an input image or feature map, or portions thereof, may decrease after a trained pooling or a sub-sampling objective of the trained sampling layer and/or the resulting resolution of the input image or feature map, or portions thereof, may increase after a trained unpooling or super-sampling objective of the trained sampling layer. Also, if a previous sub-sampling layer in the CNN reduced a resolution of an input image or feature map, the original (or another) resolution may be restored by a subsequent unpooling or super-sampling layer. In an example, in addition to some pixels resulting in having zero values due to such unpooling or super-sampling operations, in one or more embodiments all pixels that are newly generated during the unpooling or super-sampling may be set to zero. Accordingly, in an example CNN including such a sampling layer that is trained to perform such an upscaling or unpooling/super-sampling objectives, some or all pixels or values newly generated (e.g., in addition to example original lower resolution pixels or values) in the process of altering or restoring the resolution, e.g., to an original resolution prior to a previous sub-sampling or pooling operation, may be set to be zero. This setting of such new values to zero may result in 75% or more of all values of the resulting output of the sampling layer having zero values. Accordingly, if this output is then provided to another convolutional layer, and convolution is selectively performed according to a selected one of the first operation or the second operation with zero skipping, substantially less loadings and processing operations would be required compared to a typical CNN architecture that may include an unpooling or super-sampling layer that does not set newly generated values to zero, the output of which is then provided to another convolutional layer.

Figure 6:
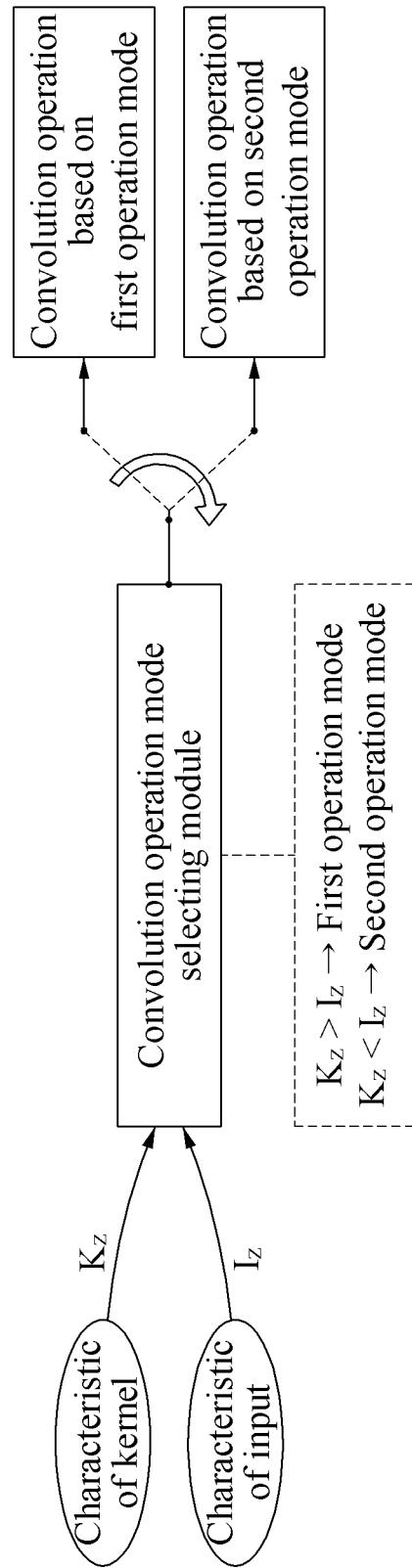
FIG. 6 is a diagram illustrating an example of a process of selecting an operation mode.

FIG. 6 is a diagram illustrating an example of a process of selecting an operation mode.

Referring to FIG. 6, the CNN processing apparatus may include a convolution operation mode selecting module, and the convolution operation mode selecting module refers to a module configured to select an operation mode for each of convolution layers of a CNN. A processor of the CNN processing apparatus may thus be configured to implement the mode selecting, e.g., as well as being configured to implement one or more CNNs described herein and one or more convolutional operations of such CNNs as described herein. The CNN processing apparatus may consider a characteristic of one or more kernels and a characteristic of an input of a convolution layer to select an operation mode of the convolution layer. The characteristic of a kernel may include at least one of a ratio of zero valued trained kernel elements in the kernel, of kernel elements among plural kernels, and/or among all kernels, or size(s) of the respective same. The characteristic of the input may include at least one of a ratio of zero valued input elements included in the input and/or a size of the input. Additional and/or alternative characteristics may also be considered. The CNN processing apparatus may select an operation mode satisfying a constraint, for example, associated with at least one of a data loading number or a capacity of an operating memory, as only examples, based on at least one of the characteristic(s) of the kernel(s), the characteristic(s) of the input, or both characteristic(s) of the kernel(s) and characteristic(s) of the input.

As illustrated in FIG. 6, in an example, the CNN processing apparatus may obtain, from an input of a convolution layer, a ratio $I_z$ of zero values in input elements included in the input. The CNN processing apparatus may obtain a ratio $K_z$ of zeros in a kernel, in kernel elements, or in all kernels of the convolution layer. For example, a ratio $I_z$ may vary depending on an input of a corresponding convolution layer, and thus the CNN processing apparatus may dynamically extract the ratio $I_z$ from the input. The ratio $K_z$ may be a value determined by a predesigned or previously trained CNN, and thus may be obtained from a database. For example, $K_z$ may be fixed. The CNN processing apparatus may select an operation mode corresponding to a greater value between the obtained ratio $I_z$ and the obtained ratio $K_z$, based on whether $I_z$ meets a first threshold, and/or based on whether $K_z$ meets a second threshold. Thus, in an example, and as demonstrated in FIG. 6, the CNN processing apparatus may select the operation mode of the convolution layer based on which one of the ratio $I_z$ and the ratio $K_z$ is greater. If $I_z$ and $K_z$ are equal, then CNN processing apparatus may be configured to automatically select the first operation mode or configured to automatically select the second operation.

In one example, the CNN processing apparatus may select the operation mode based on a ratio between a size of the input and an overall size of the kernels or a size of each or a select kernel. For example, the CNN processing apparatus may obtain a ratio between a size of a frame or channel included in the input and a size of a weight map included in or of a kernel, i.e., of a select channel of the kernel, and select the operation mode by comparing the obtained ratio to a predefined ratio. The weight map may correspond to respective weightings or values of different kernel elements of the select channel of the kernel, and in an example where the kernel elements are connection weights, the each weight in the weight map may correspond to a separate connection weight of the select channel of the kernel. The size of the frame or channel included in the input and the size of the weight map may have previously been set or determined when the CNN was trained, and thus the CNN processing apparatus may obtain, from the database, at least one of the ratio, a result of comparing the ratio to the predefined ratio, and/or the already selected or set operation mode for the previously set size of the frame or channel of the input and set size of the weight map, for one or more of the respective convolutional layers. Here, one or more embodiments further include performing training of the CNN that includes storing the ratio or storing respective sizes in a data structure for use when implementing the CNN according to selected first and second operation modes, performing the comparison and thus storing the result of the comparison in such a data structure for the implementing of the select first and second operation modes, or storing the set operation mode in such a data structure after performing the comparison for the implementing of the select first and second operation modes.

Accordingly, in an example, the CNN processing apparatus may select the operation mode corresponding to a smaller value between a first data loading number and a second data loading number. The CNN processing apparatus may thus perform the desired convolution based on trained kernels in selectively different manners when implementing the convolution, e.g., compared to when convolution may have been performed when training the kernels by a training apparatus, so a unique CNN approach can be differently implemented with a select operation mode that requires a relatively smaller data loading number. In an embodiment, during training, the kernels may be trained with the CNN configuration and convolutional operations described above with respect to FIG. 2, for example. Alternatively, in one or more embodiments, the kernels may be trained by a training apparatus, or by the CNN processing apparatus, in a same or like selected first and second operation modes of convolutional operation described herein.

In an example, in selecting between operation modes corresponding to a smaller value between a first data loading number and a second data loading number, the first data loading number may be calculated by a sum of a kernel loading number calculated based on the size of kernel(s), kernel members, or overall all kernels and an input loading number may be calculated based on a determined or estimated number of zeros among the kernel(s), kernel elements, or overall all kernels and the determined size of the input. In an example, the first data loading number may be calculated without considering a number of zeros among the input elements in the input, and thus may be determined and stored in a database when the CNN is designed and trained, and the CNN processing apparatus may obtain the first data loading number from the database. The CNN processing apparatus may dynamically obtain, from the input, the number of zeros among the input elements included in the input. The CNN processing apparatus may calculate the second data loading number based on a sum of an input loading number calculated based on the size of the input and a kernel loading number calculated based on the number of zeros among the input elements in the input and the size of the kernel(s), kernel members, or overall all kernels. The number of zeros in the input may not be a prestored value, and thus the CNN processing apparatus may calculate the second data loading number for each convolution layer. In this regard, the CNN processing apparatus may calculate the second data loading number before a corresponding input is provided to a corresponding convolution layer or subsequent to receipt of the corresponding input by the corresponding convolutional layer. The CNN processing apparatus may select the operation mode suitable for the convolution layer by comparing the first data loading number obtained from the database and the second data loading number dynamically calculated as noted above, and may dynamically/selectively not perform all convolutional operations that the kernels were trained with or not use all trained values of the trained kernels, thereby reducing the number of applied kernel elements in a corresponding convolutional layer from those preset by the trained kernels and original structure of the training CNN in combination with the first operation mode, the second operation mode, or the described selection between the first operation mode and the second operation mode.

Figure 7A:
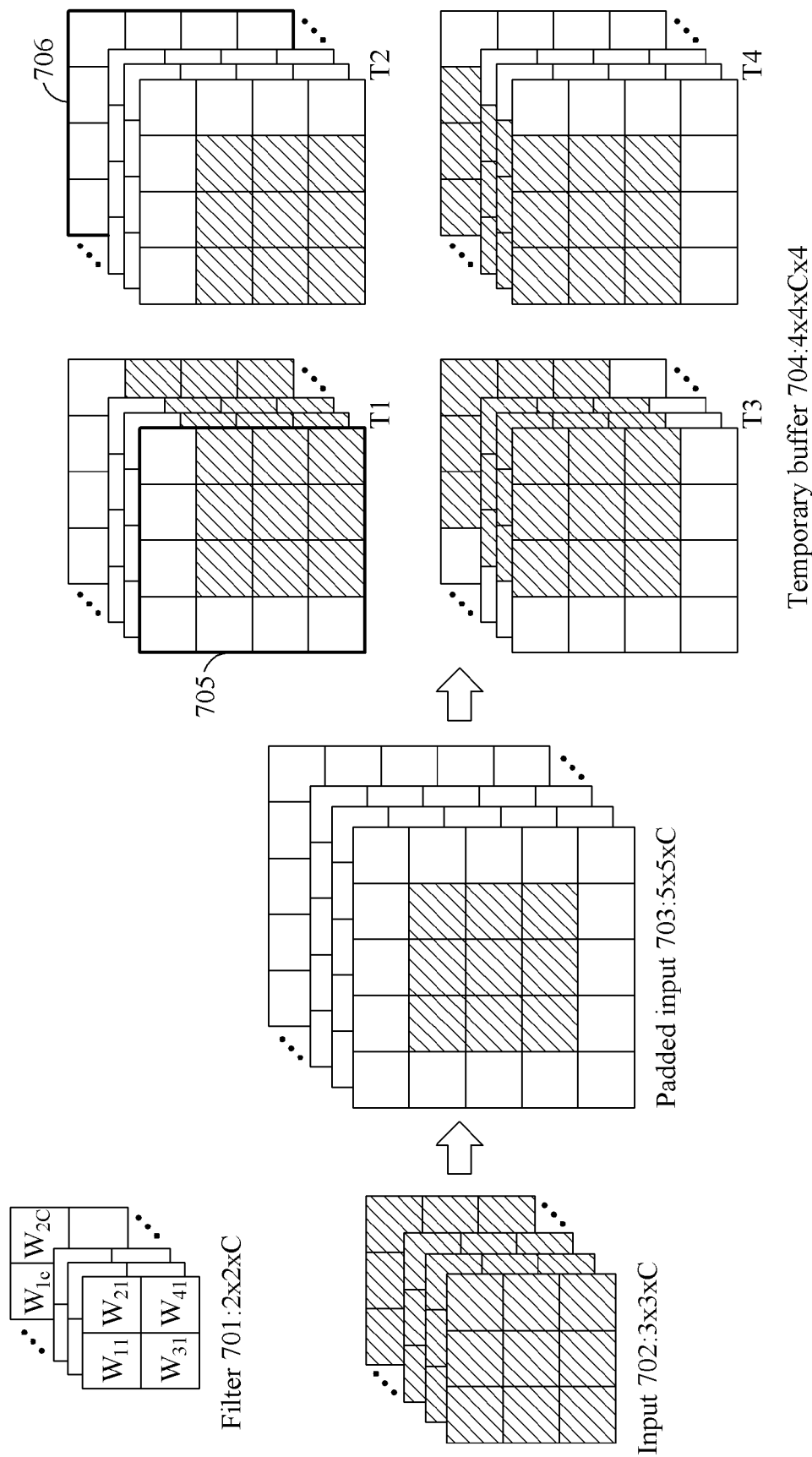
FIGS. 7A through 7C are diagrams illustrating an example of the first operation mode.
Figure 7B:
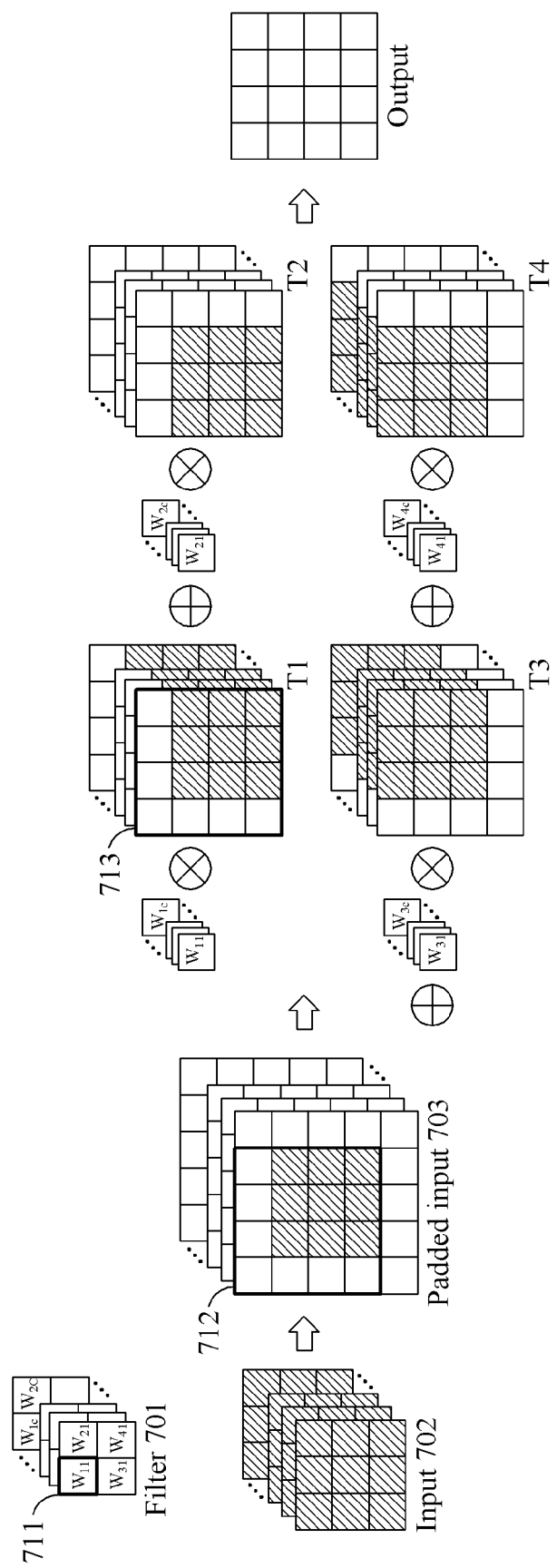
Figure 7C:
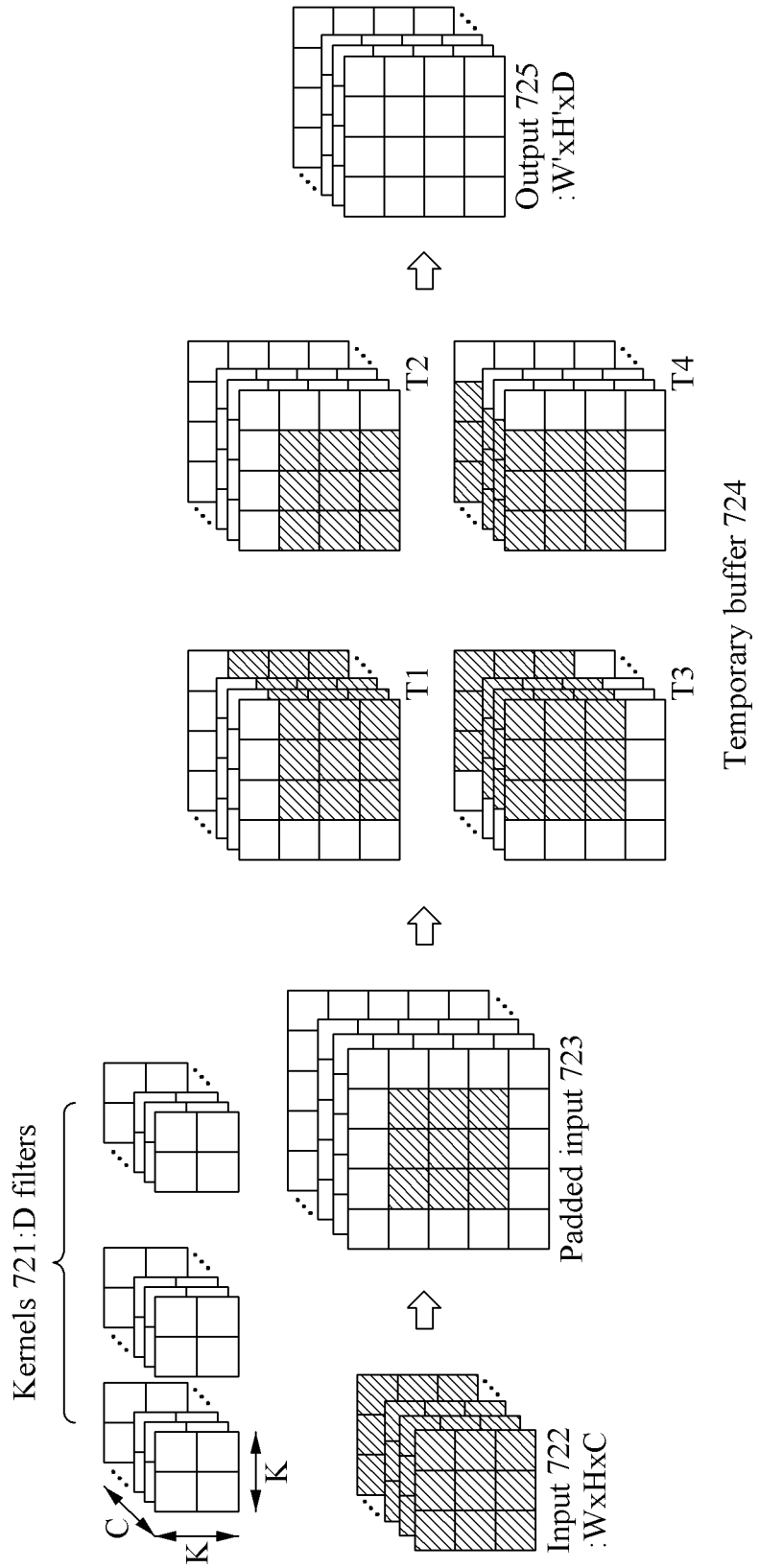

FIGS. 7A through 7C are diagrams illustrating an example of the first operation mode.

In one example, such as in response to the selection of the first operation mode by the CNN processing apparatus in the operations of FIG. 6, the CNN processing apparatus may allocate at least one temporary buffer/memory of the CNN processing apparatus to perform a convolution operation based on the first operation mode, and store input elements in the allocated temporary buffer from another temporary buffer/memory, e.g., from/of an output temporary buffer/memory for a previous layer of the CNN, an image buffer configured with respect to an image sensor, or a main memory of the CNN processing apparatus. The allocation of the temporary buffer may include defining a limited extent of the temporary buffer, e.g., dependent on a size of the input, size of the input elements, or size of a later discussed padded input 703. In an example, the input elements, as less than all image elements of an input image information, may be stored in the temporary buffer or all image elements are stored in the temporary buffer. The input elements may be stored in the temporary buffer as a vector, a matrix, or a third or greater order tensor, for example. The main memory may also include a stored photo library from which the input elements may be obtained from. The temporary buffer may be distinguished from the main memory or database of the CNN processing apparatus, which may be accessed and information loaded from, through an example bus that connects the main memory with one or more processors of the CNN processing apparatus that are configured to implement a CNN processing using trained kernels, which may also be stored in the database in the main memory, and select between implementing the first operation mode and the second operation mode based on determined characteristics of the corresponding input and/or the kernel(s) or based on set or trained selections between the first and second operation modes. Thus, with the selected or set first operation mode, the CNN processing apparatus may perform the corresponding convolution operation for each kernel element using the input elements stored in the temporary buffer, such as described above with respect to FIGS. 3-4. In further detail, an example of the first operation mode based on such an allocation of such a temporary buffer will be described hereinafter with reference to FIGS. 7A through 7C.

Referring to FIG. 7A, in the first operation mode, the CNN processing apparatus performs a convolution operation between a filter (i.e., kernel) 701 of a size of 2×2×C and an input 702 of a size of 3×3×C. When the input 702 is an image, the input 702 may be an entire image or selectively cropped image, for example, with the CNN processing apparatus being configured to perform a recognition, rejection, and/or verification of a face, iris, fingerprint, or biological vein structure of a user or subject, depending on embodiment. In such an image example, the input 702 may have multiple channels, i.e., the referenced C channels. For example, in an example of an input to a first layer of the CNN, C may be three, and there may be separate channels for red, green, and blue colors. There may also be additional or alternative channels, such as an infrared channel. Such channels may be respectively stored in the main memory, such as in the stored photo library or may be separately captured light data by an image sensor of the CNN processing apparatus that generates the respective channels of image information. Alternatively, the different channels may correspond to separate frames, such as sequential image frames of captured video. As also noted, the input may also be representative of an output of a previous layer of the CNN, and thus the number of channels may depend on a number D' of previously applied kernels/filters of a previous convolution layer. The filter 701 includes trained weight maps of which a size of each weight map is 2×2, and a number of the weight maps is C corresponding to the expected number of input 702 channels C. Though a single filter 701 is demonstrated in FIG. 7A, as demonstrated below in FIG. 7C there may be multiple filters/kernels that may be applied in the convolution operation. The input 702 includes C slices or channels of which a size of each is 3×3. As also noted above, the C slices or channels may each be a corresponding frame of information, such as separate image frames of a video sequence or different captured information for a single frame of time. A padded input 703 refers to a result obtained by applying, to the input 702, padding using a padding of 1 step, resulting in a size of the padded input 703 now being 5×5×C. The respective padded values in the padding may be zero, for example. Here, the example is described based the convolution operation being performed with a convolutional stride of 1, though embodiments are not limited thereto.

The CNN processing apparatus allocates a temporary buffer 704 corresponding to kernel elements included in the filter 701. In an example, the allocation of the temporary buffer 704 may include an allocation of a limited extent of the temporary buffer 704, e.g., dependent on the size of the padded input 703, size of the filter 701, the convolutional stride, and the number of channels C, as non-limiting examples. A size of a weight map of the filter 701 is 2×2 and the convolutional stride in which the filter 701 will be applied during the convolution is 1, and thus input elements in the padded input 703 corresponding to each kernel element, for example, a weight, of the filter 701 may be restricted to a size of 4×4 for each of separate defined/allocated partitions or portions $T_1$, $T_2$, $T_3$, and $T_4$ of the allocated temporary buffer 704. Thus, in the first operation mode, the CNN processing apparatus allocates the temporary buffer 704 to store select input elements corresponding to each kernel element in the filter 701. For example, as illustrated in FIG. 7A, the CNN processing apparatus allocates the portion $T_1$ of the temporary buffer 704, for example, for including a foremost portion thereof, for input elements 705 corresponding to the kernel element $w_{11}$, allocates a portion $T_2$ of the temporary buffer 704, for example, for including a rearmost portion thereof, for input elements 706 corresponding to a kernel element $w_{2c}$, and then loads the input elements 705 and 706, along with the remaining corresponding input elements respectively corresponding to kernel elements $w_{12}$ through $w_{1c}$ and $w_{21}$ through $w_{2c}$ into the allocated corresponding $T_1$ and $T_2$ portions of the temporary buffer 704. Similarly, input portions corresponding to kernel elements $w_{31}$ through $w_{3c}$ and $w_{41}$ through $w_{4c}$ are respectively stored in respectively allocated portions $T_3$, and $T_4$ of the temporary buffer 704. In this example, because size of the weight map of the filter 701 is 2×2, the CNN processing apparatus allocates the example four portions $T_1$, $T_2$, $T_3$, and $T_4$ of the temporary buffer 704 as illustrated. The portions $T_1$, $T_2$, $T_3$, and $T_4$ of the temporary buffer 704 may also be separately addressable, accessed, stored to, and read from. Again, in this example the portion $T_1$ of the temporary buffer 704 corresponds to kernel elements $w_{11}$, $w_{12}$, ..., $w_{1c}$, the portion $T_2$ of the temporary buffer 704 corresponds to kernel elements $w_{21}$, $w_{22}$, ..., $w_{2c}$, the portion $T_3$ of the temporary buffer 704 corresponds to kernel elements $w_{31}$, $w_{32}$, ..., $w_{3c}$, and the portion $T_4$ of the temporary buffer 704 corresponds to kernel elements $w_{41}$, $w_{42}$, ..., $w_{4c}$.

The size of the weight map is 2×2, the size of each slice or channel of the padded input 703 is 5×5, and the convolutional stride is 1 for the convolution operation, and thus the CNN processing apparatus determines a size of input elements that are involved in the respective operations of each kernel element to be 4×4, and thus allocates the portions $T_1$, $T_2$, $T_3$, and $T_4$ of the temporary buffer 704 to have respective sizes of 4×4×C. Thus, the CNN processing apparatus allocates the temporary buffer 704 of a size of 4×4×C×4. Alternatively, in an example, separate temporary buffers each with the particular 4×4×C sizes may be respectively allocated corresponding to each of the portions $T_1$, $T_2$, $T_3$, and $T_4$, and convolution operations may be performed between the filter 701 and each of the separate temporary buffers, including convolution between separate slices or channels of the filter 701 and corresponding separate slices or channels of the respective portions of the padded input 703 loaded into the separate temporary buffers.

Referring to FIG. 7B, the CNN processing apparatus may load respective kernel elements $w_{11}, w_{12}, \ldots, w_{1c}$, kernel elements $w_{21}, w_{22}, \ldots, w_{2c}$, kernel elements $w_{31}, w_{32}, \ldots, w_{3c}$, and kernel elements $w_{41}, w_{42}, \ldots, w_{4c}$ and performs respective convolution operations based on each of the loaded kernel elements and respective portions of a temporary buffer that respectively store corresponding slices or channels of select portions of the padded input 703, or perform convolution operations based on each of the loaded kernel elements and respective temporary buffers that each store corresponding slices or channels of select portions of the padded input 703. As illustrated in FIG. 7B, the kernel elements $w_{11}, w_{12}, \ldots, w_{1c}$ may correspond to a set of kernel elements having a size 1×C, e.g., as a first order tensor, the kernel elements $w_{21}, w_{22}, \ldots, w_{2c}$ may correspond to a different set of kernel elements having a size 1×C, kernel elements $w_{31}, w_{32}, \ldots, w_{3c}$ may correspond to a further set of kernel elements having a size 1×C, and kernel elements $w_{41}, w_{42}, \ldots, w_{4c}$ may correspond to a final set of kernel elements having a size 1×C. The CNN processing apparatus generates an output based on results of operations between the each of the respective loaded sets of kernel elements and corresponding input element portions of the padded input 703 stored in the example temporary buffer. As illustrated in FIG. 7B, to implement convolution, the CNN processing apparatus may perform a two-dimensional (2D) matrix scalar multiplication between the set of kernel elements $w_{11}, w_{12}, \ldots, w_{1c}$ and the input element portions stored in a the portion $T_1$ of the temporary buffer, or in a particularly allocated $T_1$ temporary buffer in another example; a 2D matrix scalar multiplication between the set of kernel elements $w_{21}, w_{22}, \ldots, w_{2c}$ and the input element portions stored in the $T_2$ portion of the temporary buffer, or in a particularly allocated $T_2$ temporary buffer in another example; a 2D matrix scalar multiplication between the set of kernel elements $w_{31}, w_{32}, \ldots, w_{3c}$ and the input element portions stored in the $T_3$ portion of the temporary buffer, or in a particularly allocated $T_3$ temporary buffer in another example; and a 2D matrix scalar multiplication between the set of kernel elements $w_{41}, w_{42}, \ldots, w_{4c}$ and input element portions stored in the $T_4$ portion of the temporary buffer, or in a particularly allocated $T_4$ temporary buffer in another example. The illustrated output may be generated through the illustrated 2D matrix wise additions of the respective results of the matrix multiplication operations. In an example, the CNN processing apparatus may load a particular kernel element $w_{11}$ among kernel elements included in the filter 701, load the illustrated input elements 712 that correspond to the kernel element $w_{11}$, i.e., those input elements that would be multiplied by the kernel element $w_{11}$ in a convolution of the filter 701 and the padded input 703, store (as illustrated input elements 713) the loaded input elements 713 in a particular $T_1$ portion of the allocated temporary buffer or in a particularly allocated temporary buffer $T_1$, and then perform a multiplication operation between the kernel element $w_{11}$ and those input elements 713 stored in the $T_1$ portion of the temporary buffer or the temporary buffer $T_1$. In such examples, the CNN processing apparatus may load the corresponding kernel elements only once. In addition, as noted, a temporary buffer may be allocated, apportioned, or classified into portions $T_1$ through $T_4$ or respective temporary buffers may be allocated as temporary buffers $T_1$ through $T_4$, and the CNN processing apparatus may repeatedly load four corresponding input elements into the appropriate portions of the temporary buffer or into appropriate separate temporary buffers for each matrix multiplication operation with respect to the filter 401 and the padded input 703 to implement the convolution operation. In this example, four portions of the temporary buffer or four temporary buffers have been discussed for being loaded and temporarily storing image element portions from the padded input 703, however there may be additional or less temporary buffer portions or temporary buffers depending on convolutional stride of the convolution, the size of the filter 701, and the size of the padded input 703. Regardless, the respective kernel elements or respective sets of kernel elements may each be loaded once, and respectively multiplied with those input elements that the respective kernel elements would have been multiplied with, e.g., as loaded into the example temporary buffers, if the filter 701 had been slid across the padded input 703 in a typical convolution operation. However, in an example, with the convolution operation being implemented from the perspective of respective kernel operations as described in the first operation mode, if any of the kernel elements are determined to have zero values, then multiple multiplication operations can be avoided that would have been performed if the same kernel elements had been slid across the padded input 703 in the typical convolution operation, or if a tensor of the whole of the filter 701 were multiplied against a tensor corresponding the padded input 703 adjusted for the convolution operation, such as if a third or second-order tensor of the filter 701 were multiplied against a third or second-order tensor corresponding the padded input 703 adjusted for the convolution operation.

FIG. 7C further demonstrates that the CNN processing apparatus may allocate a temporary buffer 724 apportioned or classified into portions $T_1$ through $T_4$, or may allocate respective temporary buffers as temporary buffers $T_1$ through $T_4$, based on a padded input 723 obtained by applying padding to an input 722 of a size of W×H×C and on kernels 721 having an overall size of K×K×C×D, and respective kernel sizes of K×K×C. The processes discussed above with FIGS. 7A-7B may again be performed, but with each of the D kernels/filters. For example, the CNN processing apparatus may generate an output 725 based on the padded input 723 and the temporary buffer 724. As noted above, in an example, results of the respective convolutions between each of the kernel/filter of the kernels 721 and the padded input 723 may be represented in different slices or channels of the output 725. Thus, in the example of FIG. 7C, multiplication operations may be selectively performed between each of kernel elements of the respective kernels/filters at one loading of the corresponding input elements into the temporary buffer(s) and multiplication between each of the corresponding kernel elements from each of the kernels/filters and the same corresponding input elements loaded into the temporary buffer(s), e.g., for different respective output slices or channels of the output 725. Alternatively, the corresponding input elements may be repeatedly loaded and with each loading multiplied by a different corresponding kernel element from each of the kernels/filters for the different respective output slices or channels of the output 725. FIGS. 7A-7C also demonstrate that same repeated collections of input elements may be loaded and applied to different, for example, singularly loaded kernel elements or portions of kernel elements.

When an operation with a loaded kernel element has completed, such as the above example multiplication of the loaded kernel element $w_{11}$ and each of the input elements 713 in FIG. 7B, the CNN processing apparatus may load another kernel element. The CNN processing apparatus may perform a determination operation to determine whether the other kernel element is zero or not zero. In response to the other kernel element not being zero, the CNN processing apparatus may proceed with the performing of the convolution operation with respect to the other kernel element. Here, in a case that input elements corresponding to a previous kernel element and input elements corresponding to the other kernel element are the same, the CNN processing apparatus performs a convolution operation using input elements currently stored in the temporary buffer. If convolution is to be performed between a current loaded kernel element and different image element portions, e.g., loaded into different temporary buffers or different portions of a same temporary buffer, then convolution with the currently loaded kernel element and both (or more) image element portions may be performed at the same time, or the temporary storing of the current loaded kernel element may be maintained while the different image element portions are loaded into the example temporary buffer and reapplied to the appropriate newly loaded image element portion in the temporary buffer. When the convolution between the corresponding kernel/filter of the kernels 721 would no longer involve the current loaded kernel element, then a next kernel element may be loaded in a same temporary buffer/memory (or portion thereof) allocated for temporarily storing one or more loaded kernel elements for the example multiplication operations. Thus, in the example of FIGS. 7A-7C, the number of image element portions stored in the example different portions $T_1$ through $T_4$ of the example temporary buffer, or in different temporary buffers $T_1$ through $T_4$, may depend on which image portions respective kernel elements interact with during the convolution, e.g., as a corresponding kernel is understood to be slid across the padded input during convolution of the kernel and the padded input. The interaction may thus depend on the size of the padded input, the convolutional stride of the convolution, and the size of the kernel.

Thus, the CNN processing apparatus may determine whether a loaded kernel element has a zero value, or alternatively may determine whether to not load the kernel if it is determined before the convolution that the kernel has a zero value. Thus, in response to the kernel element being determined to be zero, the CNN processing apparatus may skip allocation of a temporary buffer to be associated with the kernel element, or may allocate the temporary buffer and store the kernel in the temporary buffer but skip the subsequent multiplication operation for implementing the convolution with respect to the kernel element. A kernel element may be loaded and such a temporary buffer may also not be allocated if the CNN processing apparatus determines the kernel element is zero, and thus without the allocation of the corresponding temporary buffer and storing of the loaded kernel element in the temporary buffer, the loaded kernel element may merely be discarded. In response to the loaded kernel element being determined to not be zero, the CNN processing apparatus may thus allocate the temporary buffer as described above, store the loaded kernel element in the allocated temporary buffer, and proceed with the corresponding convolution operation with respect to the kernel element.

Although the first operation mode is described above in FIGS. 7A-7C in association with allocation of a temporary buffer/memory for the selective storing of loaded kernel elements, the examples described above may also be applied to the second operation mode. For example, in a case that a temporary buffer is allocated in the second operation mode, the CNN processing apparatus may store kernel elements in a similar allocated temporary buffer. In addition, the first operation mode and the second operation mode may be performed without allocation of temporary buffers.

Figure 8A:
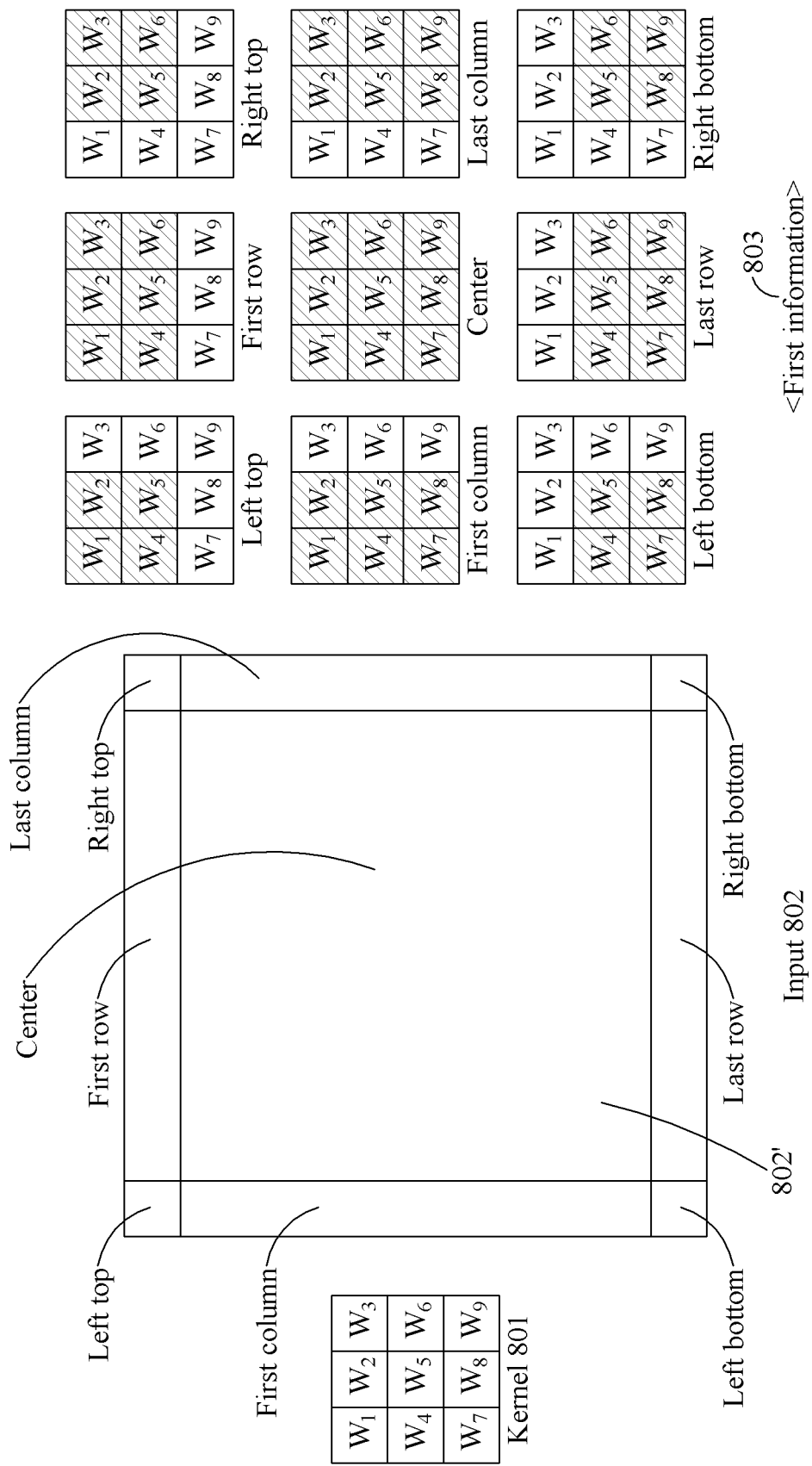
FIGS. 8A and 8B are diagrams illustrating an example of the second operation mode.
Figure 8B:
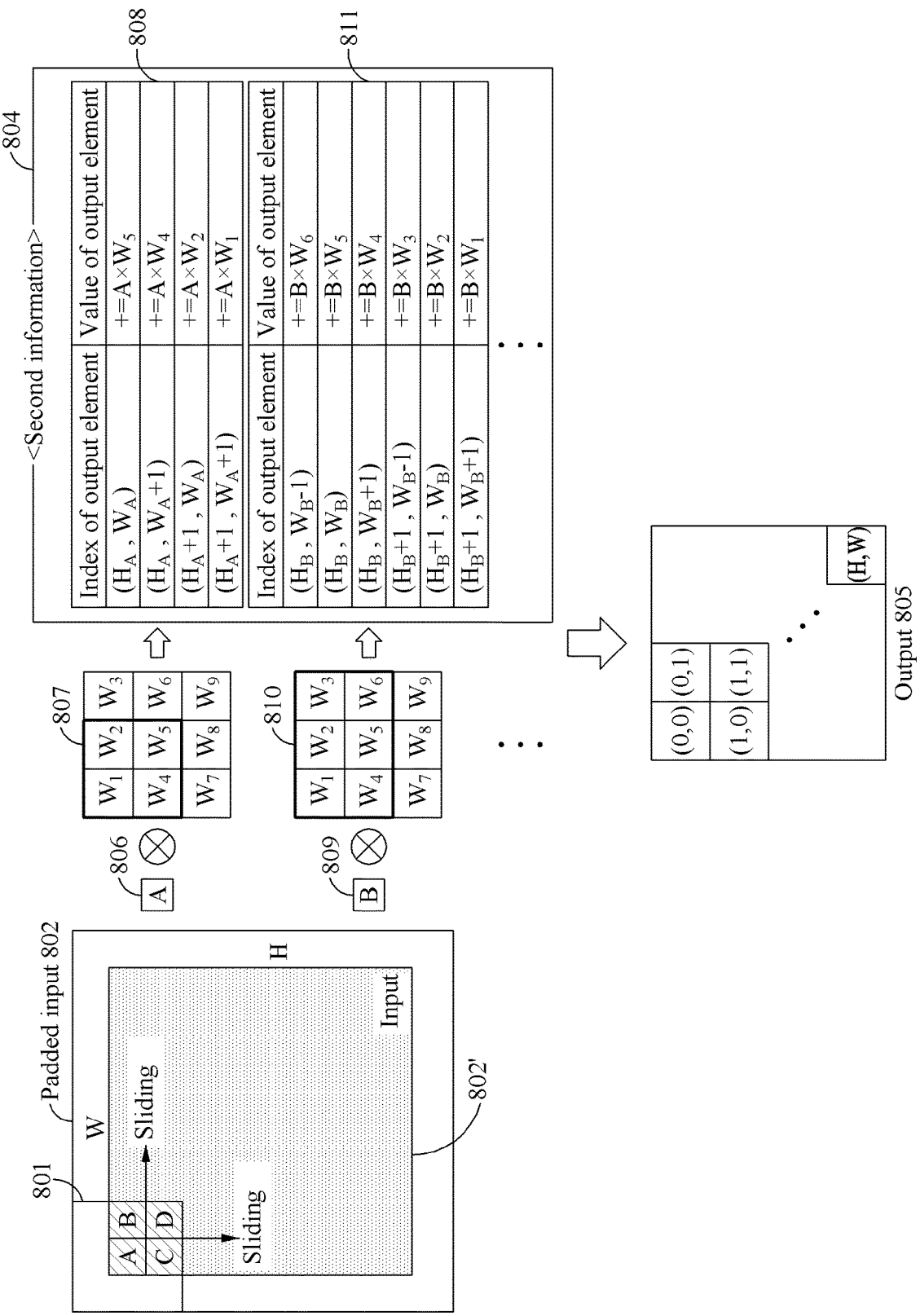

FIGS. 8A and 8B are diagrams illustrating an example of a second operation mode.

Referring to FIG. 8A, in a case that a size of a kernel 801 is 3×3, the convolutional stride is 1, and a padding width in the input 802 is 1, first information 803 specifies which of the kernel elements $w_1, \ldots, w_9$ of the kernel 801 correspond to which input element of the input 802. For example, the first information 803 specifies that kernel elements $w_1$, $w_2$, $w_4$, and $w_5$ correspond to an input element located at a left top of the non-padded portion of the input 802, input 802. Here, the correspondence between input elements and kernel elements takes into consideration the example outer edge zero values for the padded input elements of input 802, and thus the highlighted kernel elements in each of the first information 803 indicate which respective kernel elements will actually be multiplied by the corresponding input element of the input 802' in the convolution operation as the kernel 801 is slid over the input 802 in the convolution between the input 802 and the kernel 801. For example, the respective first information 803 specifies which kernel elements will be multiplied by a particularly located input element, for example, a left top, a first row, a right top, . . . , or a right bottom input element of the input 802', based on the size 3×3 of the kernel 801, the convolutional stride being 1, and a size and the padding being 1. The CNN processing apparatus loads one input element included in the input 802 or input 802', and loads the appropriate kernel elements corresponding to the loaded input element based on the first information 803. The one input element and appropriate kernel elements may respectively be stored in corresponding allocated temporary buffers/memories, such as discussed above with respect to first operation mode.

Referring to FIG. 8B, second information 804 specifies, among a plurality of output elements included in an output 805, output elements to which results of operations between a loaded input element and kernel elements are mapped, e.g., from a reference point of the location of the corresponding loaded input element. For example, in a case that a size of the input 802' is W×H and the kernel 801 is slid (for example, at a convolutional stride of 1) in a padded input 802 to which padding with a pad 801 of 1 is applied, the CNN processing apparatus loads an input element A 806 and loads kernel elements 807 $w_1$, $w_2$, $w_4$ and $w_5$ based on the first information 803, and performs an operation between the input element A 806 and each of the kernel elements 807, e.g., respective multiplication operations, the respective results of which are preliminary output values of the outputs elements of the output 805. For example, the CNN processing apparatus generates preliminary output values of output elements of the output 805 in accordance with information 808 specifying output elements $(H_A, W_A)$, $(H_A, W_A+1)$, $(H_A+1, W_A)$, and $(H_A+1, W_A+1)$ to which results of operations between the loaded input element A 806 and the loaded kernel elements 807 are mapped. Here, the location/position row and column indices $(H_A, W_A)$ of the output elements also correspond to the example same location/position indices of the input element A 806 in the input 802'. Similarly, the CNN processing apparatus loads an input element B 809 and kernel elements 810, and updates output elements based on information 811 specifying the output elements to which results of operations between the loaded input element B 809 and the loaded kernel elements 810 are mapped. Here, as each of the corresponding preliminary respective output values from the operations for input element A 806 and input element B 809 are mapped to the appropriate locations/positions in the output 805, the respective output elements of the output 805 is repetitively updated as the respective input element and kernel element operations are performed. As only an example, an ultimate output value of the output 805 at the (0,0) location may be based on a summation of $A^*w_5$ and $B^*w_6$, so the output elements may be updated as the CNN processing apparatus loads respective input elements and applies the appropriate kernel elements 810. Accordingly, in the second operation mode, the CNN processing apparatus may reduce a data loading number and an operation performing number through a method of loading and reusing an input element. For example, in a case of a loaded input element having a determined value of zero, the CNN processing apparatus may skip loading of data based on first information and skip an operation based on second information, thereby avoiding operations of the particular input element and the appropriate kernel elements. The above discussions of the first operation mode with the selective allocation of the appropriate temporary buffers/memories, and/or selective storing of loaded kernels/kernel elements and input elements in such temporary buffers/memories with respect to zero skipping operations are equally applicable to the zero skipping operation that may be performed in the second operation mode. An example of the second operation mode based on the first information and the second information may also be applied to the first operation mode.

Figure 9:
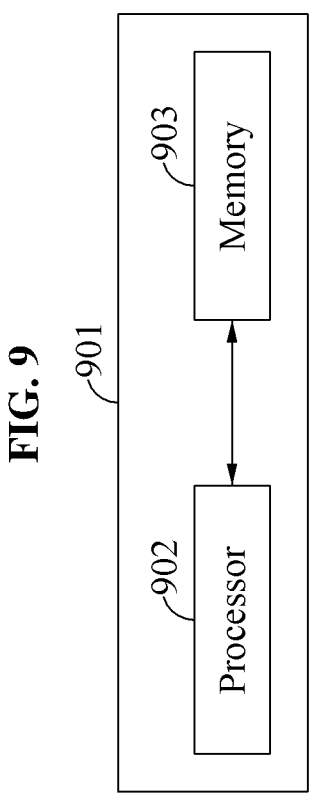
FIG. 9 is a diagram illustrating an example of an apparatus implementing a CNN.

FIG. 9 is a diagram illustrating an example of a CNN implementing apparatus.

Referring to FIG. 9, a CNN processing apparatus 901 includes a processor 902 and a memory 903. The processor 902 may include one or more or all elements and/or devices described with reference to FIGS. 1 through 8B, and/or perform one or more or all processes or methods descried with reference to FIGS. 1 through 8B. The memory 903 may store characteristics of inputs of convolution layers and characteristics of kernels of the convolution layers, as well as data loading numbers corresponding to the kernels. The memory 903 may also store two or more characteristics of any one or any combination of such characteristics of inputs of the convolution layers and characteristics of the kernels of the convolution layers, as well as determined data loading numbers corresponding to the input. The memory 903 may store instructions configured to, when executed by the processor 902, control or cause the processor to implement one or more or all CNN processing methods described herein. The memory 903 may further store hyper-parameters indicating a structure of the CNN, as well as one or more trained kernel sets for respectively implementing one or more or all layers of the CNN for a trained objective of the CNN. The memory 903 may be a volatile memory or a nonvolatile memory.

The processor 902 is representative of one or more processors. In another example, the processor 902 may be one or more reconfigurable processors and/or one or more graphics processing units that are configured to implement the CNN through graphics pipeline operators. The processor 903 may implement instructions, e.g., stored in the memory 903, that when executed by the processor 902, control the CNN processing apparatus 901, such as to control the CNN processing apparatus 901 to implement the CNN for input data, to perform a recognition, verification, and/or rejection operation of the input data, or impellent other operations of the CNN processing apparatus 901, such as a user interface and other functions of the CNN processing apparatus 901, including smart phone operations, as only an example. The CNN processing apparatus 901 may be connected to an external device, for example, a personal computer (PC) or a network, through an input and output device (not shown), and exchange data with the external device.

The CNN processing apparatus 901 may be used in or as a CNN accelerator configured to process an operation associated with a CNN at a high speed, and a neural processing unit (NPU) or a vision processing unit (VPU), to control a corresponding dedicated processor to implement one or more or all operations described herein. The CNN processing apparatus 901 may be configured to selectively perform between the operations of FIGS. 3-8B for such an acceleration operation and typical convolution operations without one or more operations of FIGS. 3-8B, such as a typical convolution operation where an entire input matrix is convoluted with an entire kernel through matrix operations or with the aforementioned typical multiple reloadings of the input and kernel elements. The CNN processing apparatus 901 may employ various types of hardware, or be employed by various types of hardware, depending on embodiment. The CNN processing apparatus 901 may not be limited to the illustrated examples of components or elements. When applying the examples described above to process the CNN, the CNN processing apparatus 901 may reduce a data loading number and an operation performing number, for example, a MAC operation performing number, from which are typically needed for processing such a CNN, and thus reduce use of a memory and increase a processing speed over the typical CNN operations. Thus, the examples described above may also be suitable to an environment using a limited resource or an embedded terminal.

Figure 10:
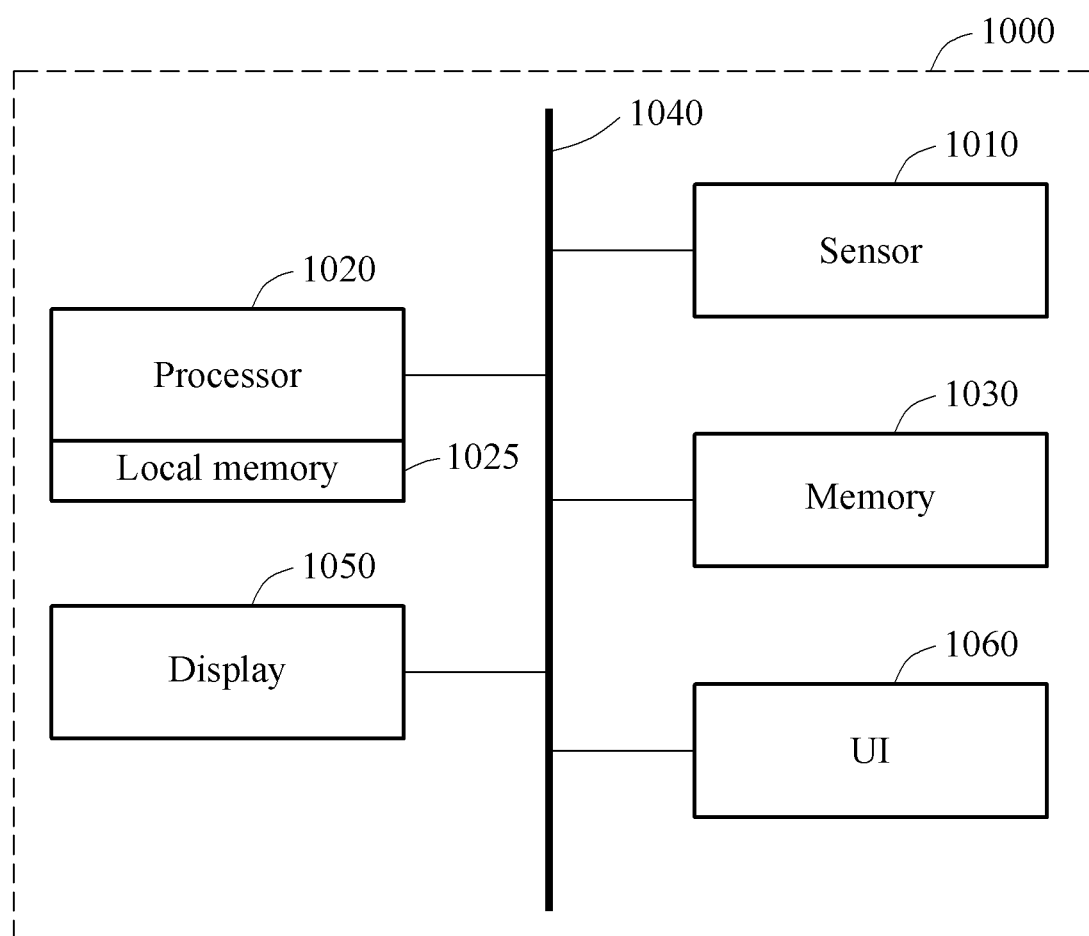
FIG. 10 is a diagram illustrating an example of an electronic system or device configured to implement a CNN.

FIG. 10 is a diagram illustrating an example of an electronic system or device configured to implement a CNN.

Referring to FIG. 10, an electronic system or device 1000 includes a sensor 1010, a processor 1020, a local memory 1025, a memory 1030, a display 1050, and a user interface (UI) 1060. The sensor 1010, the processor, 1020, the memory 1030, the display 1050, and the UI 1060 communicate with each other via a bus 1040. The electronic system or device 1000 may correspond to any one or more or all of the above CNN processing apparatuses and implement any one or more or all of the above CNN processing processes or methods. As a non-limiting example, the processor 1020 may correspond to processor 902 of FIG. 9, and/or the memory 1030 may correspond to the memory 903 of FIG. 9. The local memory 1025 may correspond to any of the above described temporary or local buffers/memories, while the memory 1030 may store a database from which kernel elements and/or image elements may be loaded from and into the local memory 1025, as discussed above with respect to the first operation mode and the second operation mode for different convolutional processing approaches. In an example, the local buffers/memories may be memories of the processor 1020 or buffers/memories directly connected to the processor 1020, e.g., configured for rapidly transferring data to/from the processor 1020 and the local memory 1025, noting that alternatives are also available. The local memory 1025 may further be allocated to temporarily store convolutional output results of a particular layer of the CNN, or all layers of the CNN, the ultimate output results of which may be stored in the memory 1030 and/or respectively used for inputs to a next layer. In an example, except for purposes of an input to a next layer, the convolutional results of each layer may discarded and only final layer(s) output results of the CNN stored to the memory 1030 or used for another process, such as in cooperation with an unlocking and corresponding display operation of a mobile phone as the electronic system or device 1000. As also noted, the processor 1020 may represent one or more processors that are configured as any or any combination of the above CNN processing apparatuses, recognition apparatuses, rejection apparatuses, and/or verification apparatuses, as non-limiting examples.

The sensor 1010 includes, for example, a microphone and/or an image sensor or camera to sense video data and audio data to recognize, reject, or verify an object, for example. The sensor 1010 senses an image using a well-known scheme, for example, a scheme of converting an optical image to an electronic signal. An output of the sensor 1010 is transferred to the processor 1020 or the memory 1030, and output of the sensor 1010 may also be transferred directly to, or operate as, an input layer of any of the CNNs discussed herein.

The processor 1020 may be configured to perform one or more or all processes described with reference to FIGS. 1 through 9. For example, to perform a recognition, rejection, or verification operation, the processor 1020 may recognize, reject, or verify the input data based on the CNN processing operations described above with respect to FIGS. 1-9, which may also be considered acceleration processes that produce an accelerated neural network implementation that may be different from the neural network from which the kernels were trained, for example. The result of any of the recognition, rejection, or verification operations may be output through the display 1050. In addition, user adjustments or selective operations of the CNN processing operations discussed herein may be provided by UI 1060, which may include a touch screen or other input device/system. As noted above, the processor 1020 may be a graphics processor unit (GPU), reconfigurable processor, or have any other type of multi- or single-processor configuration.

In addition to operations of one or more of the CNN processing apparatuses and/or operations described in FIGS. 1-9, as noted above, the memory 1030 may further store instructions which, when executed by processor 1020, cause the processor 1020 to perform additional operations, functions, and controls of the electronic system or device 1000, such as a user interface of the electronic system. The electronic system or device 1000 may be connected to an external device, for example, a personal computer (PC) or a network, via an input/output device of the electronic system, to exchange data with the external device. The electronic system or device 1000 may be various electronic devices, as only non-limiting examples, a mobile device, for example, a mobile telephone, a smartphone, a personal digital assistant (PDA), a tablet computer or a laptop computer, a computing device, for example, a PC, a tablet computer or a netbook computer, an electronic product, for example, a television (TV), a smart TV, or a security device for gate control.

The respective CNN or neural network processing apparatuses, respective local or temporary buffer or memories, respective general or main memories or databases, CNN processing apparatus 901, processor 902, memory 903, electronic system or device 1000, bus 1040, processor 1020, local memory 1025, sensor 1010, memory 1030, display 1050, and user interface 1060, for example, in FIGS. 1-10 and that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented method of processing a convolutional neural network (CNN), the method comprising:

performing a convolution operation according to an operation mode reusing a kernel with respect to a layer determined, based on at least one of a characteristic of at least one kernel of a convolution layer or characteristic of an input of the convolution layer; and wherein the performing of the convolution operation comprises:

performing the convolution operation based on first information specifying which input elements correspond to which kernel elements included in the kernel among input elements included in the input and second information specifying, among output elements included in an output of the convolution operation, output elements to which results of operations between the kernel elements and the specified input elements in the convolution operation are mapped.

2. The method of claim 1, wherein the characteristic of the at least one kernel comprises at least one of a ratio of zero value kernel elements included in the at least one kernel and non-zero value kernel elements included in the at least one kernel, and a size of the at least one kernel, and the characteristic of the input comprises at least one of a ratio of zero value input elements included in the input and non-zero value input elements included in the input, and a size of the input.

3. The method of claim 1, wherein the performing of the convolution operation comprises:

loading one kernel element among the kernel elements;

loading input elements indicated as corresponding to the loaded kernel element based on the first information; and updating output elements to which results of operations between the loaded kernel element and the loaded input elements are indicated as being mapped based on the second information.

4. The method of claim 1, wherein the first information is determined based on locations of the kernel elements, a size and a convolutional stride of the kernel, and a size and a pad of the input, and the second information is determined based on the locations of the kernel elements and locations of the specified input elements.

5. The method of claim 1, wherein the performing of the convolution operation comprises:

loading one kernel element among kernel elements included in the kernel; and in response to the loaded kernel element having a zero value, skipping loading of input elements corresponding to the loaded kernel element or skipping operations associated with the loaded kernel element.

6. The method of claim 1, wherein the performing of the convolution operation comprises:

allocating at least one temporary buffer corresponding to kernel elements included in the kernel;

loading one kernel element among the kernel elements in the kernel; and performing the convolution operation based on the loaded kernel element and a temporary buffer corresponding to the loaded kernel element.

7. The method of claim 3, wherein the performing of the convolution operation further comprises:

loading another kernel element different from the loaded kernel element among the kernel elements; and in response to the other kernel element not having a zero value, performing the convolution operation based on results of operations between the other kernel element and input elements stored in a temporary buffer corresponding to the other kernel element.

8. The method of claim 1, wherein the performing of the convolution operation comprises:
loading one kernel element among kernel elements included in the kernel;
in response to the loaded kernel element having a zero value, skipping allocation of a temporary buffer; and
in response to the loaded kernel element not being zero, allocating the temporary buffer based on a location of the loaded kernel element, a size and a convolutional stride of the kernel, and a size and a pad of the input,
loading input elements corresponding to the loaded kernel element and storing, in the allocated temporary buffer, the loaded input elements, and
performing the convolution operation based on results of operations between the loaded kernel element and the input elements stored in the temporary buffer.

9. A non-transitory computer-readable storage medium storing instructions, which when executed by computing hardware, cause the computing hardware to implement the method of claim 1.

10. An apparatus for processing a convolutional neural network (CNN), the apparatus comprising:
a processor configured to perform a convolution operation according to an operation mode reusing a kernel with respect to a layer determined based on at least one of a characteristic of at least one kernel of a convolution layer or a characteristic of an input of the convolution layer and
the processor is configured to perform the convolution operation based on first information specifying which input elements correspond to which kernel elements included in the kernel among input elements included in the input and second information specifying, among output elements included in an output of the convolution operation, output elements to which results of operations between the kernel elements and the specified input elements in the convolution operation are mapped.

11. The apparatus of claim 10, wherein the characteristic of the at least one kernel comprises at least one of a ratio of zero value kernel elements included in the at least one kernel and non-zero value kernel elements included in the at least one kernel, or a size of the at least one kernel,
the characteristic of the input comprises at least one of a ratio of zero value input elements included in the input and non-zero value input elements included in the input, or a size of the input,
the characteristic of the at least one kernel and the characteristic of the input are determined based on a depth of the convolution layer in the CNN.

12. The apparatus of claim 10, wherein the processor is configured to perform the convolution operation based on first information specifying which input elements correspond to which kernel elements included in the kernel among input elements included in the input and second information specifying, among output elements included in an output of the convolution operation, output elements to which results of operations between the kernel elements and the specified input elements in the convolution operation are mapped.

13. The apparatus of claim 10, wherein the processor is configured to load one kernel element among kernel elements included in the kernel and, in response to the loaded kernel element having a zero value, skip loading of input elements corresponding to the loaded kernel element or skip operations associated with the loaded kernel element.

14. The method of claim 1, wherein the layer performing the convolution operation according to the operation mode reusing the kernel is determined based on the number of bits of the kernel.

* * * * *